(12) United States Patent
Elshafie et al.

(10) Patent No.: US 11,848,731 B2
(45) Date of Patent: Dec. 19, 2023

(54) TECHNIQUES FOR ADAPTING COMMUNICATIONS UPON CHANNEL UNRELIABILITY EVENT

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/406,787

(22) Filed: Aug. 19, 2021

(65) Prior Publication Data
US 2023/0055394 A1 Feb. 23, 2023

(51) Int. Cl.
| | |
|---|---|
| *H04B 7/06* | (2006.01) |
| *H04W 24/02* | (2009.01) |
| *H04W 72/10* | (2009.01) |
| *H04W 72/23* | (2023.01) |

(52) U.S. Cl.
CPC ............ *H04B 7/061* (2013.01); *H04W 24/02* (2013.01); *H04W 72/23* (2023.01)

(58) Field of Classification Search
CPC ..... H04B 7/061; H04W 24/02; H04W 72/042
See application file for complete search history.

(56) References Cited

U.S. PATENT DOCUMENTS

| | | | | |
|---|---|---|---|---|
| 2018/0288756 A1* | 10/2018 | Xia | ....................... | H04W 16/28 |
| 2019/0007121 A1* | 1/2019 | Zhinong | .............. | H04B 7/0874 |
| 2021/0111835 A1* | 4/2021 | Khoshnevisan | ...... | H04W 72/02 |
| 2021/0250943 A1* | 8/2021 | Alvarino | .............. | H04L 5/0012 |
| 2021/0377876 A1* | 12/2021 | Jeoin | ..................... | H04W 24/08 |
| 2022/0279591 A1* | 9/2022 | Zhou | ................. | H04W 74/0833 |

\* cited by examiner

*Primary Examiner* — Ronald B Abelson
(74) *Attorney, Agent, or Firm* — QUALCOMM Incorporated

(57) ABSTRACT

Methods, systems, and devices for wireless communications are described. A user equipment (UE) may be configured to communicating a first message with a base station in accordance with a first antenna configuration, a first set of resources, or both. The UE may transmit capability signaling indicating a capability of the UE to adjust the first antenna configuration, the first set of resources, or both, for channel reliability management. The UE may receive, based on the capability signaling, control signaling indicating one or more parameters for channel unreliability event detection associated with a downlink channel between the base station and the UE. The UE may then communicate a second message with the base station in accordance with a second antenna configuration, a second set of resources, or both, based at least in part on a channel unreliability event detected in accordance with the one or more parameters.

29 Claims, 16 Drawing Sheets

TECHNIQUES FOR ADAPTING COMMUNICATIONS UPON CHANNEL UNRELIABILITY EVENT

FIELD OF TECHNOLOGY

The following relates to wireless communications, including techniques for adapting communications upon channel unreliability event.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless devices, such as UEs may be equipped with a number of transmit (Tx) and receive (Rx) antennas, and may be configured to perform wireless communications with multiple antennas. In some cases, performing uplink and downlink transmissions with higher quantities of Tx and Rx antennas, respectively, may help improve a reliability of the uplink and downlink transmissions. However, the use of higher quantities of Tx/Rx antennas may utilize more hardware components, and may require increased processing at the UE, thereby leading to increased power consumption and lower batter life.

SUMMARY

The described techniques relate to improved methods, systems, devices, and apparatuses that support techniques for adapting communications upon channel unreliability event. Generally, aspects of the present disclosure support techniques which enable user equipments (UEs) to adapt wireless communications at the UEs based on an identification of channel unreliability events. In particular, techniques described herein may enable UEs to switch to different antenna configurations (e.g., different sounding reference signal (SRS) sounding configurations), switch to different bandwidth parts (BWPs), or both, upon identification of a channel unreliability event. Switching to a different antenna configuration and/or different BWP may enable the UE to improve a reliability of wireless communications following the identified channel unreliability event reducing an overall power consumption at the UE.

A method for wireless communication at a UE is described. The method may include communicating one or more messages with a base station in accordance with a first antenna configuration, a first set of resources, or both, transmitting, to the base station, capability signaling indicating a capability of the UE to adjust the first antenna configuration, the first set of resources, or both, for channel reliability management, receiving, from the base station based on the capability signaling, control signaling indicating one or more parameters for channel unreliability event detection associated with a downlink channel between the base station and the UE, and communicating one or more additional messages with the base station in accordance with a second antenna configuration, a second set of resources, or both, based on a channel unreliability event detected in accordance with the one or more parameters.

An apparatus for wireless communication at a UE is described. The apparatus may include a processor, memory coupled with the processor, and instructions stored in the memory. The instructions may be executable by the processor to cause the apparatus to communicate one or more messages with a base station in accordance with a first antenna configuration, a first set of resources, or both, transmit, to the base station, capability signaling indicating a capability of the UE to adjust the first antenna configuration, the first set of resources, or both, for channel reliability management, receive, from the base station based on the capability signaling, control signaling indicating one or more parameters for channel unreliability event detection associated with a downlink channel between the base station and the UE, and communicate one or more additional messages with the base station in accordance with a second antenna configuration, a second set of resources, or both, based on a channel unreliability event detected in accordance with the one or more parameters.

Another apparatus for wireless communication at a UE is described. The apparatus may include means for communicating one or more messages with a base station in accordance with a first antenna configuration, a first set of resources, or both, means for transmitting, to the base station, capability signaling indicating a capability of the UE to adjust the first antenna configuration, the first set of resources, or both, for channel reliability management, means for receiving, from the base station based on the capability signaling, control signaling indicating one or more parameters for channel unreliability event detection associated with a downlink channel between the base station and the UE, and means for communicating one or more additional messages with the base station in accordance with a second antenna configuration, a second set of resources, or both, based on a channel unreliability event detected in accordance with the one or more parameters.

A non-transitory computer-readable medium storing code for wireless communication at a UE is described. The code may include instructions executable by a processor to communicate one or more messages with a base station in accordance with a first antenna configuration, a first set of resources, or both, transmit, to the base station, capability signaling indicating a capability of the UE to adjust the first antenna configuration, the first set of resources, or both, for channel reliability management, receive, from the base station based on the capability signaling, control signaling indicating one or more parameters for channel unreliability event detection associated with a downlink channel between the base station and the UE, and communicate one or more additional messages with the base station in accordance with a second antenna configuration, a second set of resources, or both, based on a channel unreliability event detected in accordance with the one or more parameters.

Some examples of the method, apparatuses, and non-transitory computer-readable medium described herein may further include operations, features, means, or instructions for receiving, via the control signaling, an indication of a quantity of negative acknowledgement (NACK) messages and a quantity of downlink shared channel transmissions, where the one or more parameters include the quantity of NACK messages and the quantity of downlink shared channel transmissions, where the channel unreliability event may be detected based on transmitting the quantity of NACK messages for the quantity of downlink shared channel transmissions scheduled by the base station.

Some examples of the method, apparatuses, and non-transitory computer-readable medium described herein may further include operations, features, means, or instructions for transmitting, to the base station via the capability signaling, an indication of a set of multiple antenna configurations, a set of multiple sets of resources, or both, to which the UE may switch to upon detection of the channel unreliability event, where the second antenna configuration may be included within the set of multiple antenna configurations, and where the second set of resources may be included within the set of multiple sets of resources.

Some examples of the method, apparatuses, and non-transitory computer-readable medium described herein may further include operations, features, means, or instructions for receiving, from the base station based on the capability signaling, additional control signaling indicating the second antenna configuration, an indication of the second set of resources, or both, where communicating the one or more additional messages in accordance with the second antenna configuration, the second set of resources, or both, may be based on the additional control signaling.

In some examples of the method, apparatuses, and non-transitory computer-readable medium described herein, the first antenna configuration may be associated with a first set of transmit antennas and a first set of receive antennas at the UE, the second antenna configuration may be associated with a second set of transmit antennas and a second set of receive antennas at the UE, and, and at least one of the second set of transmit antennas and the second set of receive antennas may be different from the first set of transmit antennas and the first set of receive antennas, respectively.

In some examples of the method, apparatuses, and non-transitory computer-readable medium described herein, the second set of receive antennas includes more receive antennas relative to the first set of receive antennas, the second set of transmit antennas includes more transmit antennas relative to the first set of transmit antennas, or both.

In some examples of the method, apparatuses, and non-transitory computer-readable medium described herein, the second set of receive antennas includes each receive antenna at the UE, and the second set of transmit antennas includes each transmit antenna at the UE, or both.

In some examples of the method, apparatuses, and non-transitory computer-readable medium described herein, the second antenna configuration may be associated with full antenna sounding at the UE.

In some examples of the method, apparatuses, and non-transitory computer-readable medium described herein, the second set of resources includes a second BWP which may be larger than the first BWP and the method, apparatuses, and non-transitory computer-readable medium may include further operations, features, means, or instructions for performing a BWP switching procedure from the first BWP to the second BWP based on the identification of the channel unreliability event, where communicating the one or more messages with the base station in accordance with the second antenna configuration, the second set of resources, or both, may be based on performing the BWP switching procedure.

Some examples of the method, apparatuses, and non-transitory computer-readable medium described herein may further include operations, features, means, or instructions for receiving, via the control signaling, an indication of a time interval for performing BWP switching procedures, the one or more parameters indicating the time interval, where the BWP switching procedure may be performed during a time period that occurs subsequent to the identification of the channel unreliability event which may be greater than or equal to the time interval.

Some examples of the method, apparatuses, and non-transitory computer-readable medium described herein may further include operations, features, means, or instructions for transmitting, via the capability signaling, an indication of one or more time intervals supported by the UE, the one or more time intervals including the time interval.

In some examples of the method, apparatuses, and non-transitory computer-readable medium described herein, the first set of resources includes a first resource block pattern, a first sounding pattern, or both, and the second set of resources includes a second resource block pattern, a second sounding pattern, or both.

In some examples of the method, apparatuses, and non-transitory computer-readable medium described herein, the first antenna configuration includes a first combination density, and the second antenna configuration includes a second combination density which may be greater than the first combination density.

In some examples of the method, apparatuses, and non-transitory computer-readable medium described herein, the first antenna configuration includes a first SRS repetition density, and the second antenna configuration includes a second SRS repetition density which may be greater than the first SRS repetition density.

Some examples of the method, apparatuses, and non-transitory computer-readable medium described herein may further include operations, features, means, or instructions for receiving, via the control signaling, an indication of an antenna grouping configuration which allocates a set of multiple antennas of the UE into one or more sounding groups, where communicating the one or more additional messages with the base station in accordance with the second antenna configuration, the second set of resources, or both, includes communicating in accordance with the antenna grouping configuration.

Some examples of the method, apparatuses, and non-transitory computer-readable medium described herein may further include operations, features, means, or instructions for transmitting, via the capability signaling, an indication of a set of multiple antenna grouping configurations supported by the UE, where the antenna grouping configuration may be included within the set of multiple antenna grouping configurations.

Some examples of the method, apparatuses, and non-transitory computer-readable medium described herein may further include operations, features, means, or instructions for receiving, via the control signaling, an indication of the second set of resources, where communicating the one or more additional messages with the base station in accordance with the second set of resources may be based on receiving the indication of the second set of resources.

Some examples of the method, apparatuses, and non-transitory computer-readable medium described herein may further include operations, features, means, or instructions for receiving additional control signaling from the base station and communicating with the base station in accordance with the first antenna configuration, the first set of resources, or both, based on receiving the additional control signaling.

Some examples of the method, apparatuses, and non-transitory computer-readable medium described herein may further include operations, features, means, or instructions for communicating with the base station in accordance with the first antenna configuration, the first set of resources, or both, based on an identification of a channel reliability event associated with the downlink channel between the base station and the UE.

Some examples of the method, apparatuses, and non-transitory computer-readable medium described herein may further include operations, features, means, or instructions for receiving, via the control signaling, an indication of one or more additional parameters for channel reliability event detection, where the channel reliability event may be detected in accordance with the one or more additional parameters.

Some examples of the method, apparatuses, and non-transitory computer-readable medium described herein may further include operations, features, means, or instructions for receiving, via the control signaling, an indication of a quantity of positive acknowledgement (ACK) messages and a quantity of downlink shared channel transmissions, where the one or more parameters include the quantity of positive ACK messages and the quantity of downlink shared channel transmissions, where the channel reliability event may be identified based on transmitting the quantity of positive ACK messages for the quantity of downlink shared channel transmissions scheduled by the base station.

In some examples of the method, apparatuses, and non-transitory computer-readable medium described herein, the control signaling includes a radio resource control (RRC) message, a medium access control-control element (MAC-CE) message, or both.

A method for wireless communication at a base station is described. The method may include communicating one or more messages with a UE in accordance with a first antenna configuration at the UE, a first set of resources, or both, receiving, from the UE, capability signaling indicating a capability of the UE to adjust the first antenna configuration, the first set of resources, or both, for channel reliability management, transmitting, to the UE based on the capability signaling, control signaling indicating one or more parameters for channel unreliability event detection associated with a downlink channel between the base station and the UE, and communicating one or more additional messages with the UE in accordance with a second antenna configuration at the UE, a second set of resources, or both, based on a channel unreliability event detected in accordance with the one or more parameters.

An apparatus for wireless communication at a base station is described. The apparatus may include a processor, memory coupled with the processor, and instructions stored in the memory. The instructions may be executable by the processor to cause the apparatus to communicate one or more messages with a UE in accordance with a first antenna configuration at the UE, a first set of resources, or both, receive, from the UE, capability signaling indicating a capability of the UE to adjust the first antenna configuration, the first set of resources, or both, for channel reliability management, transmit, to the UE based on the capability signaling, control signaling indicating one or more parameters for channel unreliability event detection associated with a downlink channel between the base station and the UE, and communicate one or more additional messages with the UE in accordance with a second antenna configuration at the UE, a second set of resources, or both, based on a channel unreliability event detected in accordance with the one or more parameters.

Another apparatus for wireless communication at a base station is described. The apparatus may include means for communicating one or more messages with a UE in accordance with a first antenna configuration at the UE, a first set of resources, or both, means for receiving, from the UE, capability signaling indicating a capability of the UE to adjust the first antenna configuration, the first set of resources, or both, for channel reliability management, means for transmitting, to the UE based on the capability signaling, control signaling indicating one or more parameters for channel unreliability event detection associated with a downlink channel between the base station and the UE, and means for communicating one or more additional messages with the UE in accordance with a second antenna configuration at the UE, a second set of resources, or both, based on a channel unreliability event detected in accordance with the one or more parameters.

A non-transitory computer-readable medium storing code for wireless communication at a base station is described. The code may include instructions executable by a processor to communicate one or more messages with a UE in accordance with a first antenna configuration at the UE, a first set of resources, or both, receive, from the UE, capability signaling indicating a capability of the UE to adjust the first antenna configuration, the first set of resources, or both, for channel reliability management, transmit, to the UE based on the capability signaling, control signaling indicating one or more parameters for channel unreliability event detection associated with a downlink channel between the base station and the UE, and communicate one or more additional messages with the UE in accordance with a second antenna configuration at the UE, a second set of resources, or both, based on a channel unreliability event detected in accordance with the one or more parameters.

Some examples of the method, apparatuses, and non-transitory computer-readable medium described herein may further include operations, features, means, or instructions for transmitting, via the control signaling, an indication of a quantity of NACK messages and a quantity of downlink shared channel transmissions, where the one or more parameters include the quantity of NACK messages and the quantity of downlink shared channel transmissions, where the channel unreliability event may be detected based on receiving the quantity of NACK messages for the quantity of downlink shared channel transmissions scheduled by the base station.

Some examples of the method, apparatuses, and non-transitory computer-readable medium described herein may further include operations, features, means, or instructions for receiving, from the UE via the capability signaling, an indication of a set of multiple antenna configurations, a set of multiple sets of resources, or both, to which the UE may switch to upon detection of the channel unreliability event, where the second antenna configuration may be included within the set of multiple antenna configurations, and where the second set of resources may be included within the set of multiple sets of resources.

Some examples of the method, apparatuses, and non-transitory computer-readable medium described herein may further include operations, features, means, or instructions for transmitting, to the UE based on the capability signaling, additional control signaling indicating the second antenna configuration, an indication of the second set of resources, or both, where communicating the one or more additional messages in accordance with the second antenna configuration, the second set of resources, or both, may be based on the additional control signaling.

In some examples of the method, apparatuses, and non-transitory computer-readable medium described herein, the first antenna configuration may be associated with a first set of transmit antennas and a first set of receive antennas at the UE, the second antenna configuration may be associated with a second set of transmit antennas and a second set of receive antennas at the UE, and, and at least one of the second set of transmit antennas and the second set of receive antennas may be different from the first set of transmit antennas and the first set of receive antennas, respectively.

In some examples of the method, apparatuses, and non-transitory computer-readable medium described herein, the second set of receive antennas includes more receive antennas relative to the first set of receive antennas, the second set of transmit antennas includes more transmit antennas relative to the first set of transmit antennas, or both.

In some examples of the method, apparatuses, and non-transitory computer-readable medium described herein, the second set of receive antennas includes each receive antenna at the UE, and the second set of transmit antennas includes each transmit antenna at the UE, or both.

In some examples of the method, apparatuses, and non-transitory computer-readable medium described herein, the second antenna configuration may be associated with full antenna sounding at the UE.

Some examples of the method, apparatuses, and non-transitory computer-readable medium described herein may further include operations, features, means, or instructions for transmitting, via the control signaling, an indication of a time interval for performing BWP switching procedures at the UE, the one or more parameters indicating the time interval, where communicating the one or more additional messages in accordance with the second set of resources, or both, may be based on the time interval.

Some examples of the method, apparatuses, and non-transitory computer-readable medium described herein may further include operations, features, means, or instructions for receiving, via the capability signaling, an indication of one or more time intervals supported by the UE, the one or more time intervals including the time interval.

In some examples of the method, apparatuses, and non-transitory computer-readable medium described herein, the first set of resources includes a first resource block pattern, a first sounding pattern, or both, and the second set of resources includes a second resource block pattern, a second sounding pattern, or both.

In some examples of the method, apparatuses, and non-transitory computer-readable medium described herein, the first antenna configuration includes a first combination density, and the second antenna configuration includes a second combination density which may be greater than the first combination density.

In some examples of the method, apparatuses, and non-transitory computer-readable medium described herein, the first antenna configuration includes a first SRS repetition density, and the second antenna configuration includes a second SRS repetition density which may be greater than the first SRS repetition density.

Some examples of the method, apparatuses, and non-transitory computer-readable medium described herein may further include operations, features, means, or instructions for transmitting, via the control signaling, an indication of an antenna grouping configuration which allocates a set of multiple antennas of the UE into one or more sounding groups, where communicating the one or more additional messages with the UE in accordance with the second antenna configuration, the second set of resources, or both, includes communicating in accordance with the antenna grouping configuration.

Some examples of the method, apparatuses, and non-transitory computer-readable medium described herein may further include operations, features, means, or instructions for receiving, via the capability signaling, an indication of a set of multiple antenna grouping configurations supported by the UE, where the antenna grouping configuration may be included within the set of multiple antenna grouping configurations.

Some examples of the method, apparatuses, and non-transitory computer-readable medium described herein may further include operations, features, means, or instructions for transmitting, via the control signaling, an indication of the second set of resources, where communicating the one or more additional messages with the UE in accordance with the second set of resources may be based on transmitting the indication of the second set of resources.

Some examples of the method, apparatuses, and non-transitory computer-readable medium described herein may further include operations, features, means, or instructions for transmitting additional control signaling to the UE and communicating with the UE in accordance with the first antenna configuration, the first set of resources, or both, based on transmitting the additional control signaling.

Some examples of the method, apparatuses, and non-transitory computer-readable medium described herein may further include operations, features, means, or instructions for communicating with the UE in accordance with the first antenna configuration, the first set of resources, or both, based on an identification of a channel reliability event associated with the downlink channel between the base station and the UE.

Some examples of the method, apparatuses, and non-transitory computer-readable medium described herein may further include operations, features, means, or instructions for transmitting, via the control signaling, an indication of one or more additional parameters for channel reliability event detection, where the channel reliability event may be detected in accordance with the one or more additional parameters.

Some examples of the method, apparatuses, and non-transitory computer-readable medium described herein may further include operations, features, means, or instructions for transmitting, via the control signaling, an indication of a quantity of positive ACK messages and a quantity of downlink shared channel transmissions, where the one or more parameters include the quantity of positive ACK messages and the quantity of downlink shared channel transmissions, where the channel reliability event may be identified based on receiving the quantity of positive ACK messages for the quantity of downlink shared channel transmissions scheduled by the base station.

In some examples of the method, apparatuses, and non-transitory computer-readable medium described herein, the control signaling includes a RRC message, a MAC-CE message, or both.

DETAILED DESCRIPTION

Figure 1:
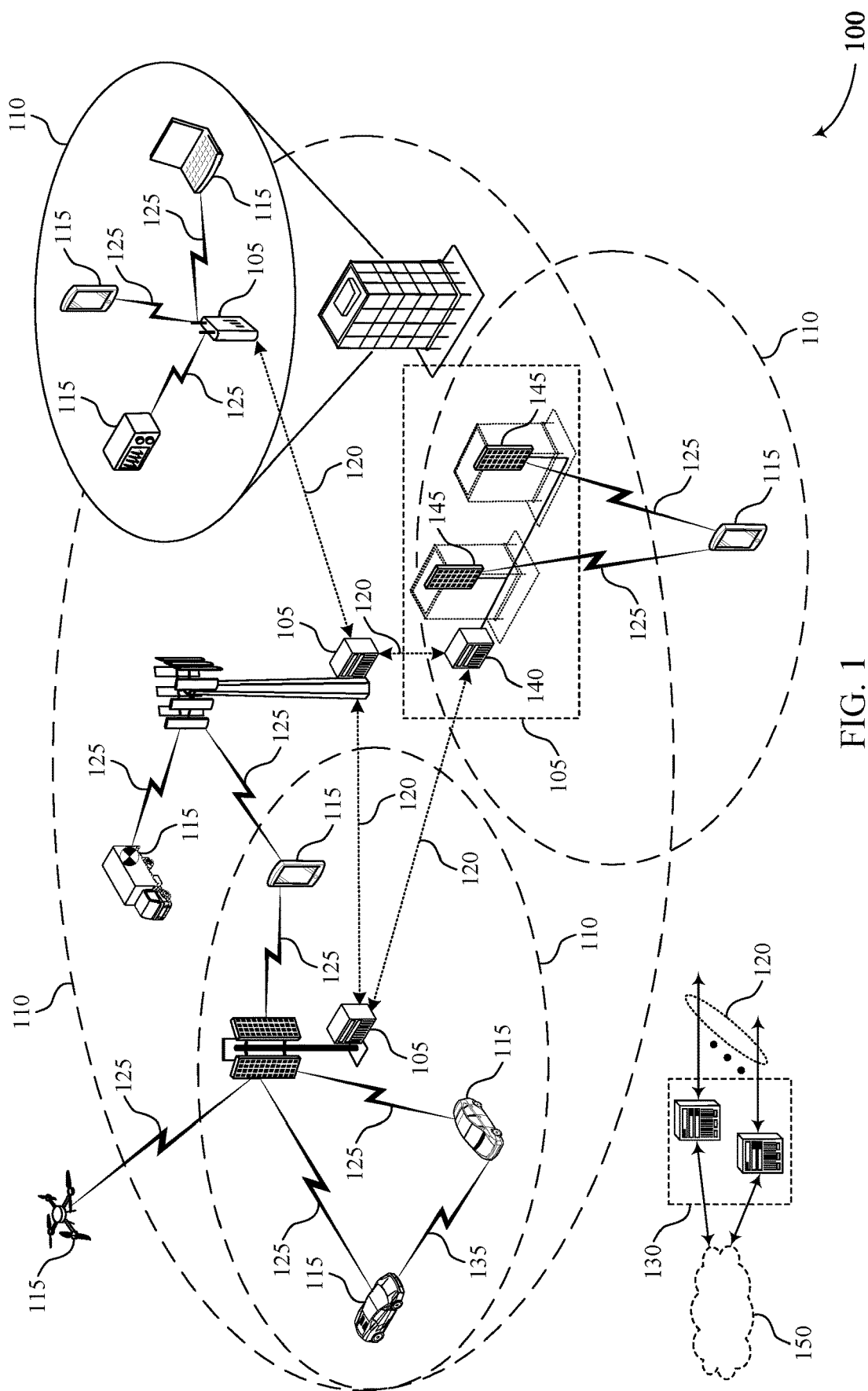
FIG. 1 illustrates an example of a wireless communications system that supports techniques for adapting communications upon channel unreliability event in accordance with aspects of the present disclosure.

Some wireless devices, such as user equipments (UEs) may be equipped with a number of transmit (Tx) and receive (Rx) antennas, and may be configured to perform wireless communications with multiple antennas. In some cases, performing uplink transmissions with higher quantities of Tx antennas may help improve a reliability of the uplink transmissions. Conversely, receiving downlink transmissions with higher quantities of Rx antennas may help improve a reliability of the downlink transmissions. In order to enable the network to perform channel estimation based on Tx/Rx antennas which are to be used for communications at a UE, the UE may be configured to transmit sounding reference signals (SRSs) in accordance with various antenna configurations (e.g., SRS antenna sounding configurations, xTyR configurations) which are associated with the Tx/Rx antennas that are to be used.

However, the use of higher quantities of Tx/Rx antennas may utilize more hardware components, and may require increased processing at the UE, thereby leading to increased power consumption and lower batter life. For example, in order to communicate with larger quantities of antennas, a UE may be configured to perform SRS and/or CSI-RS sounding with larger quantities of antennas, which requires additional hardware components and more complex processing at the UE. As such, it may be undesirable for the UE to always communicate using large quantities of antennas, and to perform SRS/CSI-RS sounding across large quantities of antennas.

Accordingly, aspects of the present disclosure are directed to techniques which enable UEs to adapt wireless communications at the UEs based on an identification of channel unreliability events. In particular, techniques descried herein may enable UEs to switch to different antenna configurations (e.g., SRS antenna sounding configurations), switch to different bandwidth parts (BWPs), or both, upon identification of a channel unreliability event. Switching to a different antenna configuration and/or different BWP may enable the UE to improve a reliability of wireless communications following the identified channel unreliability event while reducing an overall power consumption at the UE.

For the purposes of the present disclosure, the term "antenna configuration" may be used to refer to different hardware configurations at a wireless device, including different quantities and/or groupings of Rx/Tx antennas (e.g., different xTyR antenna configurations, different xTzGyR antenna configurations). Additionally, or alternatively, the term "antenna configuration" may refer to different communications or sounding configurations at a wireless device, including SRS repetition density, combination density, resource block patterns, sounding patterns (e.g., SRS sounding patterns), or any combination thereof.

In some cases, the UE may be configured (e.g., via radio resource control (RRC) signaling) with parameters for identifying channel unreliability events. For the purposes of the present disclosure, the term "channel unreliability event" may be used to refer to any event or set of parameter/characteristics which indicate that a channel (e.g., channel between a UE 115 and the network) exhibits a performance below some threshold, or is otherwise inefficient or unreliable. Conversely, the term "channel reliability event" may refer to any event or set of parameter/characteristics which indicate that a channel exhibits a performance above some threshold or is otherwise sufficiently reliable (e.g., cases with low interference/noise, high proportion of ACKs responsive to scheduled communications). For example, in some cases, the UE may identify a channel unreliability event if the UE transmits M negative acknowledgment (NACK) messages in response to N downlink transmissions scheduled by the network within some time interval. Additionally, the UE may utilize UE capability signaling to indicate which antenna configurations (e.g., xTyR configurations) and/or which BWPs the UE may switch to upon identification of a channel unreliability event. In addition to switching antenna configurations and/or switching BWPs, the UE may adapt wireless communications at the UE in response to a channel unreliability event by changing resource block patterns, SRS sounding patterns, and/or an SRS repetition density.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for adapting communications upon channel unreliability event.

FIG. 1 illustrates an example of a wireless communications system 100 that supports techniques for adapting communications upon channel unreliability event in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques which enable UEs 115 to adapt wireless communications at the UEs 115 based on an identification of channel unreliability events. In particular, techniques descried herein may enable UEs 115 of the wireless communications system 100 to switch to different antenna configurations (e.g., SRS antenna sounding configurations), switch to different BWPs, or both, upon identification of a channel unreliability event. Switching to a different antenna configuration and/or different BWP may enable the UE 115 to improve a reliability of wireless communications following the identified channel unreliability event while reducing an overall power consumption at the UE 115.

In some cases, the UE 115 may be configured (e.g., via RRC signaling, MAC-CE signaling) with parameters for identifying channel unreliability events. In some cases, the UE 115 may identify a channel unreliability event if the UE 115 transmits M NACKs in response to N downlink transmissions (e.g., physical downlink shared channel (PDSCH) transmissions) scheduled by the network within some time interval. The network may define additional and/or alternative channel unreliability events which are to be monitored by the UE 115. For the purposes of the present disclosure, the term "channel unreliability event" may refer to any event or set of parameter/characteristics which indicate that a channel (e.g., channel between a UE 115 and the network) exhibits a performance below some threshold, or is otherwise inefficient or unreliable. As such, channel unreliability events may be identified in cases with high levels of interference or noise, or in cases where a large proportion of NACKs are transmitted in response to scheduled communications. Conversely, the term "channel reliability event" may refer to any event or set of parameter/characteristics which indicate that a channel exhibits a performance above some threshold or is otherwise sufficiently reliable (e.g., cases with low interference/noise, high proportion of ACKs responsive to scheduled communications).

Moreover, the UE 115 may utilize UE 115 capability signaling to indicate which antenna configurations (e.g., xTyR configurations) and/or which BWPs the UE 115 may switch to upon identification of a channel unreliability event. In addition to switching antenna configurations and/or switching BWPs, the UE may adapt wireless communications at the UE 115 in response to a channel unreliability event by changing resource block patterns, SRS/CSI-RS sounding patterns, and/or an SRS repetition density.

Techniques described herein may improve a reliability of wireless communications within the wireless communications system 100 while simultaneously reducing power consumption at the UE 115. In particular, techniques described herein may enable UEs 115 to communicate with the network using less power-intensive antenna configurations and/or resources, and may enable the UEs 115 to switch to more reliable (and more power-intensive) antenna configurations and/or resources upon identification of a channel reliability event. Accordingly, techniques descried herein may reduce an overall power consumption at the UE 115, and may enable for more reliable wireless communications with the network upon identification of a channel unreliability event.

Figure 2:
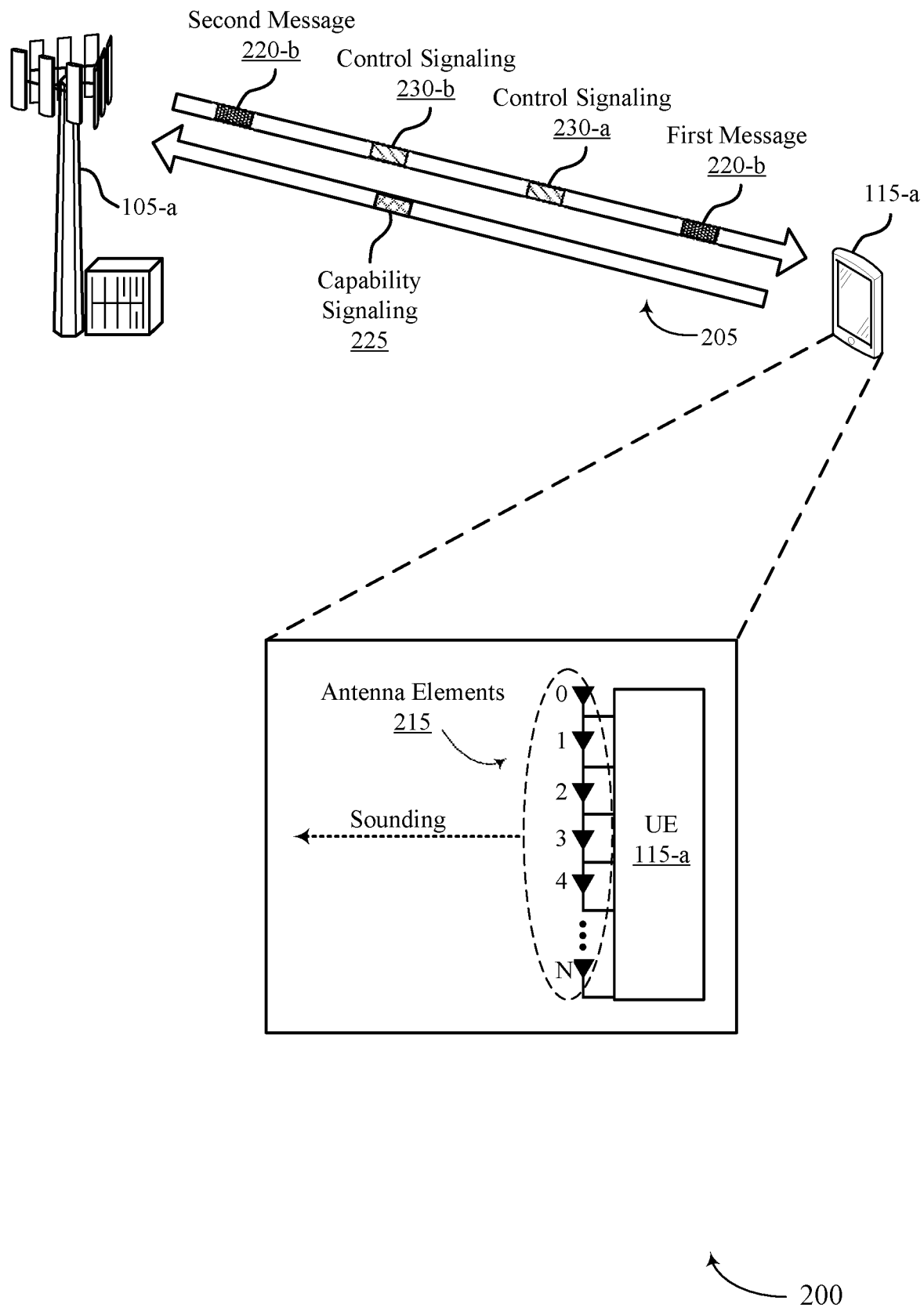
FIG. 2 illustrates an example of a wireless communications system that supports techniques for adapting communications upon channel unreliability event in accordance with aspects of the present disclosure.

FIG. 2 illustrates an example of a wireless communications system 200 that supports techniques for adapting communications upon channel unreliability event in accordance with aspects of the present disclosure. In some examples, wireless communications system 200 may implement, or be implemented by, aspects of wireless communications system 100. For example, wireless communications system 200 may support techniques for adjusting antenna configurations, resources, or both, upon identification of channel unreliability events, as described in FIG. 1.

The wireless communications system 200 may include a base station 105-a and a UE 115-a, which may be examples base stations 105 and UEs 115 as described with reference to FIG. 1. The UE 115-a may communicate with the base station 105-a using a communication link 205, which may be an example of an NR or LTE link between the UE 115-a and the base station 105-a. In some cases, the communication link 205 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals (e.g., physical uplink shared channel (PUSCH) transmissions), to the base station 105-a using the communication link 205 and the base station 105-a may transmit downlink signals, such as downlink control signals or downlink data signals, to the UE 115-a using the communication link 205.

As noted previously herein, some wireless devices (e.g., UE 115-a) may be equipped with a number of transmit (Tx) and receive (Rx) antennas, and may be configured to perform wireless communications with multiple antennas. For example, as shown in FIG. 2, the UE 115-a may include a set of antenna elements 215. Wireless devices may be equipped with different antenna configurations, such as 1T2R (e.g., 1 transmit antenna, 2 receive antennas), 1T4R (e.g., 1 transmit antenna, 4 receive antennas), 2T2R (e.g., 2 transmit antenna, 2 receive antennas), 4T4R (e.g., 4 transmit antenna, 4 receive antennas), and the like. In some cases, performing uplink transmissions with higher quantities of Tx antennas may help improve a reliability of the uplink transmissions, particularly for uplink MIMO operation. In particular, higher quantities of Tx antennas may be applied to increase the quantity of ports for SRSs, PUSCH transmissions, and/or link diversity for PUSCH transmissions. Similarly, receiving downlink transmissions with higher quantities of Rx antennas may help improve a reliability of the downlink transmissions, particularly for downlink MIMO operation and in the context of SU-MIMO and MU-MIMO operation in downlink. In order to enable the network (e.g., base station 105-a) to perform channel estimation based on Tx/Rx antennas which are to be used for communications at the UE 115-a, the UE 115-a may be configured to transmit SRSs in accordance with various antenna configurations (e.g., SRS antenna sounding configurations, xTyR configurations) which are associated with the Tx/Rx antennas that are to be used.

However, the use of higher quantities of Tx/Rx antennas may utilize more hardware components, and may require increased processing at the UE 115-a, thereby leading to increased power consumption and lower batter life. For example, in order to communicate with larger quantities of antennas, the UE 115-a may be configured to perform SRS sounding and/or CSI-RS with larger quantities of antennas, which requires additional hardware components and more complex processing at the UE 115-a. Moreover, using more antennas leads to more time/power resources for uplink SRS sounding. As such, it may be undesirable for the UE 115-a to always communicate using large quantities of antennas, and to perform SRS sounding across large quantities of antennas. Further, some UEs 115 with large quantities of antennas (e.g., 6Rx, 8Rx) may not sound all antennas due to the large power consumption and insertion loss.

Accordingly, some aspects of the present disclosure are directed to adaptively modifying antenna configurations at the UE 115- (e.g., xTyR antenna configuration adaptation) to improve power savings at the UE 115-a. In particular, as will be described in further detail herein, the UE 115-*a* may be configured to "fallback" to less power intensive antenna configurations (e.g., fallback from larger number of Tx/Rx antennas to a smaller number of Tx/Rx antennas) to reduce a power consumption at the UE 115-*a*. For example, the UE 115-*a* may fallback from a 2T4R antenna configuration to a 1T2R antenna configuration to save power. In this example, the base station 105-*a* may configure fewer SRS resources, or SRS resources with fewer ports for SRS Tx port switching than the UE 115-*a* is capable of performing, effectively reducing the power consumption at the UE 115-*a*. Conversely, the UE 115-*a* may be configured to switch to more efficient and reliable (but more power intensive) antenna configurations in cases where the UE 115-*a* experiences interference or identifies that the channel between the UE 115-*a* and the base station 105-*a* is unreliable (e.g., upon identification of a channel unreliability event).

Additionally, or alternatively, techniques described herein may enable power savings at the UE 115-*a* by adaptively modifying resources which are used to communicate with the base station 105-*a*. Some wireless communications systems may support BWP-dependent uplink and downlink layer adaptation. Specifically, different uplink and/or downlink BWPs may be associated with different quantities of uplink/downlink layers and/or ports, which may result in different levels of power consumption at the UE 115-*a*. As such, some techniques of the present disclosure are directed to dynamic BWP switching at the UE 115-*a*. By dynamically switching BWPs, power savings at the UE 115-*a* may be achieved by adapting different quantities of layers for wireless communications. For example, in cases where there is heavy traffic within the wireless communications system 200, switching to a larger BWP with higher quantities of layers may enable more efficient data communication, and thereby lower power consumption at the UE 115-*a*. Conversely, in cases where there is inactive or light traffic within the wireless communications system 200, switching to a narrow BWP with lower quantities of layers may lower the power consumption at the UE 115-*a*. Delays associated with switching between BWPs (e.g., delay attributable to performing a BWP switching procedure) may be in the order of milliseconds, thereby minimizing interruptions of data communications at the UE 115-*a*.

In some cases, the UE 115-*a* may experience different types of interference within the wireless communications system 200, including same-link interference and/or cross-link interference. The UE 115-*a* may experience same-link interference may result when the UE 115-*a* receives communications from UEs 115 within the same cell (intra-cell) or other cells (inter-cell or neighboring cells) of the wireless communications system 200. Comparatively, the UE 115-*a* may experience cross-link interference when the UE 115-*a* receives communications from cells, such as in the case of different uplink/downlink slot configurations in neighboring cells associated with the same carrier and/or adjacent carriers. In some cases, the use of larger quantities of antennas at the UE 115-*a* may help combat interference experienced at the UE 115-*a*. Accordingly, as will be described in further detail herein, the UE 115-*a* may be configured to dynamically adjust antenna configurations (e.g., dynamically adjust xTyR antenna configurations) to improve a reliability of wireless communications at the UE 115-*a* in cases where the UE 115-*a* experiences interference or identifies a channel unreliability event.

For example, the wireless communications system 200 may support applications, such as ultra-reliable low-latency communications (URLLC), industrial internet of things (HOT) applications, or the like, in which wireless communications are extremely reliable and the probability of NACK is very low. When a wireless communication is interrupted or is otherwise unsuccessful and the UE 115-*a* transmits a NACK message, the UE 115-*a* and the base station 105-*a* may act to ensure that the reliability of wireless communications is maintained (e.g., maintain $1*10^{-5}$ residual block error rate (BLER) within several transmissions). However, in some cases, this reliability and low BLER may not be achieved unless higher spatial dimensions are used or higher SNR is achieved, such as through higher resource block allocation or higher/larger BWP. When multiple NACK messages within a window of transmissions is observed (e.g., quantity of NACKs responsive to communications scheduled by the base station 105-*a* within some time window), this may be an indication of poor channel quality or high interference (e.g., jamming). In such cases, using higher spatial dimensions (e.g., larger quantities of Tx/Rx antennas at the UE 115-*a*) and/or switching to higher BWP can help achieve higher reliability of wireless communications.

Accordingly, aspects of the present disclosure are directed to techniques which enable the UE 115-*a* to dynamically adapt wireless communications at the UE 115-*a* based on an identification of channel unreliability events. In particular, techniques descried herein may enable the UE 115-*a* to switch to different antenna configurations (e.g., SRS antenna sounding configurations), switch to different sets of resources (e.g., different BWPs), or both, upon identification of a channel unreliability event. Switching to a different antenna configuration and/or different BWP may enable the UE 115-*a* to improve a reliability of wireless communications following the identified channel unreliability event, while reducing an overall power consumption at the UE 115-*a*.

For example, the UE 115-*a* may communicate a first message 220-*a* (or a first set of messages) with the base station 105-*a* in accordance with a first antenna configuration, a first set of resources, or both. For example, the UE 115-*a* may transmit or receive a first message 220-*a* using a first BWP. By way of another example, the UE 115-*a* may transmit or receive a first message 220-*a* using a first antenna configuration. The first antenna configuration may be associated with defined quantities of Tx and Rx antennas (e.g., xTyR antenna configuration), an antenna grouping configuration (e.g., xTzGyR antenna configuration), a first SRS repetition density, a first combination density, a first resource block pattern, a first sounding pattern (e.g., SRS sounding pattern), or any combination thereof.

The UE 115-*a* may transmit capability signaling 225 (e.g., UE capability report) to the base station 105-*a*, where the capability signaling 225 indicates a capability of the UE 115-*a* to adjust the first antenna configuration and/or the first set of resources for channel reliability management. In other words, the capability signaling 225 may indicate that the UE 115-*a* is capable of dynamically adjusting an antenna configuration and/or resources at the UE 115-*a* to improve a reliability of communications performed via a channel between the UE 115-*a* and the base station 105-*a* (e.g., indicate support for xTyR adaptation or resource adaptation).

For example, the capability signaling 225 may indicate that the UE 115-*a* is able to dynamically adjust the antenna configuration and/or resources at the UE 115-*a* in response to identified channel unreliability events. For instance, the UE 115-*a* may announce (via the capability signaling 225) that it is capable of switching from a low Tx/Rx antenna configuration (e.g., 1T2R) to a higher Tx/Rx antenna configuration (e.g., 2T4R) based on PDSCH decoding and/or identified channel unreliability events.

By way of another example, the capability signaling may indicate a set of antenna configurations and/or a set of resources (e.g., set of BWPs) to which the UE 115-a is capable of switching to upon identification of a channel unreliability event. In other words, in the context of xTyR antenna configurations, the UE 115-a may indicate which x and y values it supports (e.g., which xTyR antenna configurations the UE 115-b may switch to) upon identification of a channel unreality event. For instance, in some cases, the capability signaling 225 may indicate an ability or preference to communicate according to xTyR antenna configurations in which x is equal to y (e.g., antenna configurations with equal quantities of Tx/Rx antennas). Similarly, the capability signaling 225 may indicate a set of antenna grouping configurations which it may switch to upon identification of a channel unreliability event. In other words, in the context of xTzGyR antenna configurations, the UE 115-a may indicate which x, y, and z values it supports (e.g., which xTzGyR antenna configurations the UE 115-b may switch to) upon identification of a channel unreality event. In a specific example, the capability signaling 225 may indicate that the UE 115-b is able to switch to a second antenna configuration associated with full antenna sounding upon identification of a channel unreliability event.

Additionally, or alternatively, the capability signaling 225 may indicate one or more characteristics or parameters associated with switching antenna configurations and/or resources at the UE 115-a in response to channel unreliability events, such as a time duration or time delay for performing antenna configuration switching or BWP switching procedures. For example, in some cases, the capability signaling 225 may indicate or suggest defined time intervals or time offsets (e.g., minimum Z values) for performance of BWP switching procedures following an identified channel unreliability event. For instance, the capability signaling 225 may indicate Z=10 symbols, thereby indicating that the UE 115-a is able to perform a BWP switching procedure ten symbols after an identification of a channel unreliability event.

In some aspects, the UE 115-a may receive control signaling 230-a (e.g., RRC message, MAC-CE message, downlink control information (DCI) message) from the base station 105-a. In some aspects, the control signaling 230-a may indicate one or more parameters for channel unreliability event detection associated with a downlink channel between the base station 105-a and the UE 115-a. In this regard, the control signaling 230-a may indicate parameters or characteristics for identifying channel unreliability events. In other words, the control signaling 230-a may configure one or more channel unreliability events which are to be monitored by the UE 115-a and/or base station 105-a.

For example, the control signaling 230-a may configure the UE 115-a to identify a channel unreliability event if the UE 115-a transmits M NACK messages in response to N downlink shared channel transmissions (e.g., PDSCH transmissions, where M and N are integers, and M<N) scheduled by the base station 105-a within some time interval. In other words, the control signaling 230-a may configure the UE 115-a to identify a channel unreliability event if M NACK messages are observed (e.g., transmitted) within a period of N PDSCH transmissions. In this example, the quantity of NACK messages and the quantity of PDSCH transmissions (e.g., M and N, respectively), may be indicated via the control signaling 230-a, and may include parameters for channel unreliability event detection.

The control signaling 230-a may indicate any quantity of parameters for identifying one or more channel unreliability events. For example, the base station 105-a may configure the UE 115-a to identify channel unreliability events if the UE 115-a determines that one or more parameters associated with communications between the UE 115-a and the base station 105-a (e.g., BLER, SNR, SINR, channel quality indicator (CQI)) satisfies one or more respective thresholds.

Additionally, or alternatively, the UE 115-a may receive additional control signaling 230-b from the base station 105-a. The additional control signaling 230-b may indicate a second antenna configuration and/or a second set of resources which the UE 115-a is to switch to for channel reliability management. In other words, the additional control signaling 230-b (e.g., RRC message, MAC-CE message, DCI message) may indicate which antenna configuration and/or set of resources that the UE 115-a is to switch to upon identification of a channel unreliability event. In this regard, the additional control signaling 230-b may indicate a BWP which is to be used in case of observed the event of M NACKs within a window of N PDSCH transmissions.

For example, in cases where the capability signaling 225 indicates sets of antenna configurations and/or sets of resources to which the UE 115-b may switch to upon identification of a channel unreliability event, the additional control signaling 230-b may indicate one of the supported antenna configurations or supported resources which the UE 115-a is to switch to upon identification of a channel unreliability event. In other words, the additional control signaling 230-b may indicate which xTyR or xTzGyR antenna configuration the UE 115-a is to switch to upon identification of a channel unreliability event.

By way of another example, the additional control signaling 230-b may indicate a time interval or time offset indicating a timing for performing BWP switching procedures following a channel unreliability event. For instance, the capability signaling 225 may indicate supported or preferred minimum time offset values (e.g., Z values) for performing BWP switching procedures at the UE 115-a. In this example, the additional control signaling 230-b may indicate a time offset value (X) for performing BWP switching procedures, where X is greater than or equal to Z (X≥Z) (e.g., time offset for BWP switching procedure is greater than or equal to the UEs 115-a capability).

The base station 105-a may be configured to transmit the additional control signaling 230 based on (e.g., in response to) receiving the capability signaling 225. Moreover, in some aspects, the additional control signaling 230-b may include a separate message or signaling as compared to the control signaling 230-a. Additionally, or alternatively, the additional control signaling 230-b and the control signaling 230-a at 415 may include the same control signaling 230 (e.g., same RRC or MAC-CE message).

Subsequently, the UE 115-a may identify a channel unreliability event. In particular, the UE 115-a may identify a channel unreliability event in accordance with the one or more parameters for channel unreliability event detection which were received via the control signaling 230-a and/or additional control signaling 230-b. In this regard, the UE 115-a may identify the channel unreliability event based on communicating the first message 220-a via the first antenna configuration and/or first set of resources, transmitting the capability signaling 225, receiving the control signaling 230-a, 230-b, or any combination thereof.

For example, the control signaling 230-*a* may configure the UE 115-*a* to identify a channel unreliability event if M NACK messages are observed (e.g., transmitted) within a period of N PDSCH transmissions, in which M and N are parameters for channel unreliability event detection. In this example, the UE 115-*a* may identify a channel unreliability event based on transmitting M NACK messages in response to N downlink shared channel transmissions scheduled by the base station 105-*a* within some time interval. Additionally, or alternatively, the UE 115-*a* may identify the channel unreliability event based on other parameters or characteristics configured via the control signaling 230-*a*. For example, the UE 115-*a* may identify the channel unreliability event based on one or more parameters/characteristics associated with communications between the UE 115-*a* and the base station 105-*a* (e.g., BLER, SNR, SINR, CQI) satisfying one or more respective thresholds.

In some aspects, the UE 115-*a* may dynamically adjust the antenna configuration and/or set of resources at the UE 115-*a* to improve a reliability of wireless communications at the UE 115-*a* (e.g., for channel reliability management). For example, the UE 115-*a* may adjust from the first antenna configuration to a second antenna configuration, from the first set of resources to a second set of resources, or both. In particular, the UE 115-*a* may adjust the antenna configuration and/or set of resources based on (e.g., in response to) identifying the channel unreliability event. In this regard, the UE 115-*a* may adjust the antenna configuration and/or set of resources at 430 based on communicating the first message 220-*a* via the first antenna configuration and/or first set of resources, transmitting the capability signaling 225, receiving the control signaling 230-*a*, 230-*b*, identifying the channel unreliability event, or any combination thereof.

For example, the UE 115-*a* may change from the first antenna configuration to a second antenna configuration in order to improve a reliability of wireless communications at the UE 115-*a* (xTyR adaptation). In some aspects, the UE 115-*a* may dynamically adjust from a lower Tx/Rx antenna configuration, such as 1T2R, to a higher Tx/Rx antenna configuration, such as 2T4R. In other words, the UE 115-*b* may switch to a second antenna configuration with higher quantities of Tx and/or Rx antennas. Moreover, in some cases, the UE 1115-*b* may switch to the second antenna configuration which was indicated via the additional control signaling 230-*b*.

Additionally, or alternatively, the UE 115-*a* may adjust from the first antenna configuration to a second antenna configuration which exhibits different parameters and/or improved reliability or efficiency as compared to the first antenna configuration. For example, the UE 115-*a* may adjust from the first antenna configuration to a second antenna configuration which exhibits a different antenna grouping configuration (e.g., xTzGyR antenna configuration), a different SRS repetition density, a different combination density, a different resource block pattern, a different sounding pattern (e.g., SRS sounding pattern), or any combination thereof.

For instance, the UE 115-*b* may switch to a second antenna configuration which is associated with full resource block or full antenna sounding (or another defined resource block pattern or sounding pattern with larger quantities of resource blocks) for SRS and/or CSI-RS sounding when the channel unreliability event is detected. For instance, the second antenna configuration may include each Tx and Rx antenna at the UE 115-*a*. In cases where antenna grouping is used at the UE 115-*a*, the channel unreliability event may trigger the use of full antenna sounding or a certain antenna grouping (e.g., antenna grouping configuration) that is pre-configured via the control signaling 230-*a*, 230-*b*. Moreover, control signaling 230-*a*, 230-*b* may indicate which SRS resources may be used with the second antenna configuration (e.g., use x1Tx2GyR instead of another configured value when regular procedure takes place, or use full sounding in case of channel unreliability event).

In some cases, the UE 115-*a* may switch to a second antenna configuration which is associated with a higher repetition density and/or higher combination density as compared to the first antenna configuration. For example, the UE 115-*a* may switch from the first antenna configuration associated with partial frequency sounding and first combination density (e.g., comb x) to the second antenna configuration associated with full sounding and a second combination density (e.g., comb z) which is greater than the first combination density (e.g., comb z>comb x). In other cases, the UE 115-*a* may switch to a second antenna configuration which is associated with higher SRS repetitions per resource (e.g., higher quantities of OFDM symbols).

By way of another example, the UE 115-*a* may perform a BWP switching procedure to switch from a first BWP (e.g., first set of resources) to a second BWP (e.g., second set of resources). In some cases, the UE 115-*a* may perform the BWP switching procedure to switch to a larger (e.g., wider) BWP which may enable more reliable wireless communications.

A relative timing for performing the BWP switching procedure may be pre-defined, signaled to the UE 115-*a* via the control signaling 230-*a*, or both. For example, the control signaling 230-*a* may indicate a time interval (e.g., quantity of slots, symbols, or other TTIs) following identification of a channel unreliability event which the UE 115-*a* is to perform the BWP switching procedure. For instance, in cases where the capability signaling indicates that the UE 115-*a* is to switch BWPs ten symbols after identification of a channel unreliability event (e.g., Z=10), the UE 115-*a* may perform the BWP switching procedure ten symbols after identifying the channel unreliability event. Further, in some aspects, the UE 115-*a* may indicate or suggest time intervals/time offsets (e.g., Z values) for performance of BWP switching procedures which the UE 115-*a* supports via the capability signaling 225.

By way of another example, the capability signaling may suggest a defined time interval (e.g., minimum time interval) or defined time offset (e.g., minimum) for performance of BWP switching symbols to be ten symbols (e.g., Z=10). In this example, the control signaling 230-*a*, 230-*b* may indicate a different time interval (X) (e.g., X time units/slots/symbols, etc.) which is greater than or equal to the time interval suggested by the UE 115-*b*. For instance, the control signaling 230-*a*, 230-*b* may configure the UE 115-*a* to perform BWP switching procedures 15 symbols after an identified channel unreliability event (e.g., X=15, where X≥Z). The value of the time interval for performance of BWP switching procedures may be pre-configured (e.g., via RRC signaling, MAC-CE signaling). Additionally, or alternatively, the value of the time interval for performance of BWP switching procedures may set via a DCI message which configures a semi-persistent scheduling (SPS) PDSCH transmission, as SPS scheduling may rigger multiple PDSCH transmissions across one more SPS configurations.

The UE 115-*a* may communicate a second message 220-*b* (or a second set of messages) with the base station 105-*a* in accordance with the second antenna configuration, the second set of resources, or both. For example, the UE 115-*a* may transmit or receive a second message 220-*b* using the second BWP based on performing the BWP switching procedure. By way of another example, the UE 115-*a* may transmit or receive a second message 220-*b* using the second antenna configuration which the UE 115-*a* switched to following the channel unreliability event. In this regard, the UE 115-*a* may communicate the second message 220-*b* based on communicating the first message 220-*a* via the first antenna configuration and/or first set of resources, transmitting the capability signaling 225, receiving the control signaling 230-*a*, 230-*b*, identifying the channel unreliability event, changing the antenna configuration and/or set or resources, or any combination thereof.

Techniques described herein may improve a reliability of wireless communications within the wireless communications system 200 while simultaneously reducing power consumption at the UE 115-*a*. In particular, techniques described herein may enable the UE 115-*a* to communicate with the base station 105-*a* using less power-intensive antenna configurations and/or resources, and may enable the UE 115-*a* to switch to more reliable (and more power-intensive) antenna configurations and/or resources upon identification of a channel reliability event. Accordingly, techniques descried herein may reduce an overall power consumption at the UE 115-*a*, and may enable for more reliable wireless communications with the network upon identification of a channel unreliability event.

Figure 3:
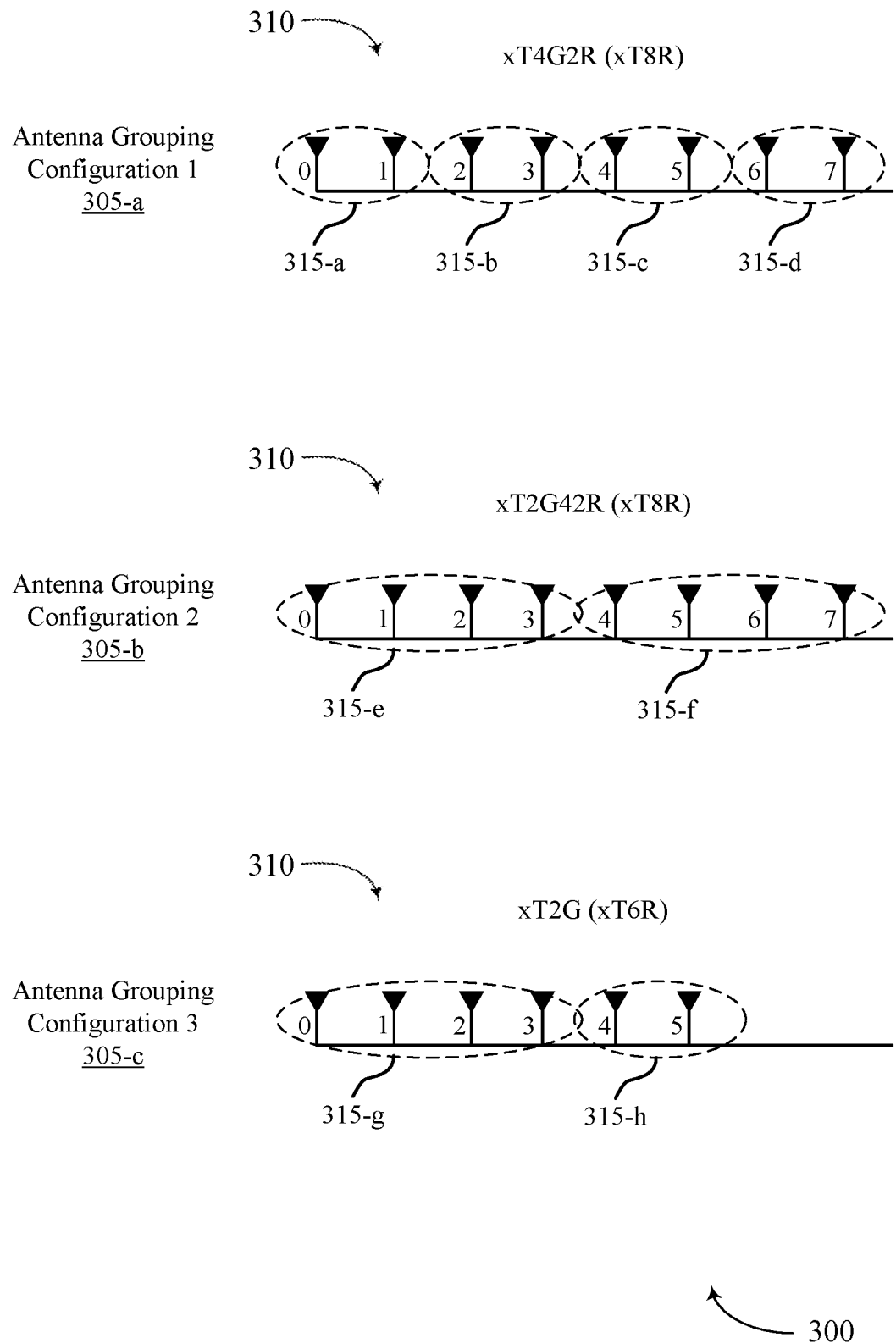
FIG. 3 illustrates an example of an antenna configuration that supports techniques for adapting communications upon channel unreliability event in accordance with aspects of the present disclosure.

FIG. 3 illustrates an example of an antenna configuration 300 that supports techniques for adapting communications upon channel unreliability event in accordance with aspects of the present disclosure. In some examples, antenna configuration 300 may implement, or be implemented by, aspects of wireless communications system 100, wireless communications system 200, or both. In particular, antenna configuration 300 illustrates antenna grouping configurations 305 which may be implemented at a UE 115, such as the UE 115-*a* illustrated in FIG. 2. In this regard, the set of antennas 310 illustrated in the respective antenna grouping configurations 305 may include examples of the set of antennas 215 of the UE 115-*a* illustrated in FIG. 2.

In some aspects, UEs 115 may be configured to communicate in accordance with one or more antenna grouping configurations 305. In the context of antenna grouping configurations 305 (e.g., SRS grouping), a UE 115 may be configured to divide antenna elements into groups, and only sound one or more antenna elements from each group. For example, referring to a first antenna grouping configuration 305-*a*, the UE 115 may divide up a set of antennas 310 into four separate groups 315-*a*, 315-*b*, 315-*c*, and 315-*d*, and may sound one or more antennas within each respective group 315. In such cases, the UE 115 may report correlation among antennas within the same group 315, and the network (e.g., base station 105-*a*) may perform interpolation/extraction based on the correlation and uplink sounding to get the full channel matrix between the UE 115 and the network. In other words, if there are some fixed relationships between different groups 315 of antennas, the network may be able to determine or approximate SRS sounding without the UE 115 sounding each antenna from the set of antennas 310, and without introducing additional time/power resources for SRS sounding.

As such, SRS grouping (e.g., antenna grouping configurations 305) may enable UE-assisted channel reconstruction based on partial spatial sounding, in which the UE 115 performs SRS sounding using a subset of the set of antennas 310 with additional correlation information (e.g., correlations/relationships between the respective groups 315). In some aspects, as described with reference to FIG. 2, the UE 115 may indicate supported antenna grouping configurations 305 via capability signaling (e.g., capability signaling 225). In this regard, the UE 115 may report SRS grouping capability, which may sometimes be reported along with SRS switching capabilities.

In some aspects, the groping across the set of antennas 310 may be uniform. In other words, the set of antennas 310 may be grouped according to xTyGzR, where x defines a quantity of Tx antennas for each SRS, z defines a quantity of Rx antennas for each group 315, and y defines the quantity of groups 315 of antenna ports. In such cases, xTyGzR may correspond to xTyzR SRS switching. For example, the first antenna grouping configuration 305-*a* may divide the set of antennas 310 up into four groups 315-*a*, 315-*b*, 315-*c*, and 315-*d*, where each group 315 includes two antenna elements (e.g., two antenna ports per group 315, xT4G2R). Similarly, the second antenna grouping configuration 305-*b* may divide the set of antennas 310 up into two groups 315-*e* and 315-*f*, where each group 315 includes four antenna elements (e.g., four antenna ports per group 315, xT2G4R).

Additionally, or alternatively, the groping across the set of antennas 310 may be non-uniform. In the context of non-uniform grouping, the quantity of antenna elements/ports within each respective group 315 may be different. For example, the third antenna grouping configuration 305-*c* may divide the set of antennas 310 up into two groups 315-*g* and 315-*h*, where the first group 315-*g* includes four antenna elements (e.g., 4R) and the second group 315-*h* includes two antenna elements (e.g., 2R). In this example, the UE 115 may sound y antennas in the first group 315-*g* and z antennas in the second group 315-*h*.

As noted previously herein, in some aspects, the UE 115-*a* of the wireless communications system 200 may dynamically switch antenna configurations (e.g., dynamically switch antenna grouping configurations 305) upon identification of a channel unreliability event. In particular, the UE 115-*a* may switch antenna configurations in order to improve a reliability of wireless communications at the UE 115-*a*. In some cases, upon identification of a channel unreliability event, the UE 115-*a* may switch to an antenna configuration (e.g., antenna grouping configuration 305) which may provide the network with a more comprehensive picture of the channel, and thereby improve channel estimation and a reliability of wireless communications. In this regard, the UE 115-*a* may switch to an antenna configuration/antenna grouping configuration 305 which may facilitate improved antenna sounding.

For example, the UE 115-*a* may originally communicate with the network in accordance with the second antenna grouping configuration 305-*b*. Upon identifying a channel unreliability event, the UE 115-*a* may dynamically switch to the first antenna grouping configuration 305-*a*. As shown in FIG. 3, the first antenna grouping configuration 305-*a* includes more groups 315 and less antennas per group 315 as compared to the second antenna grouping configuration 305-*b*. In this regard, the first antenna grouping configuration 305-*a* may provide more complete sounding across the set of antennas 310 as compared to the second antenna grouping configuration 305-*b*. As such, by dynamically switching to the first antenna grouping configuration 305-*a* upon identifying a channel unreliability event, the UE 115-*a* may enable more comprehensive SRS sounding, which may improve channel estimation and improve a reliability of wireless communications at the UE 115-*a*.

Figure 4:
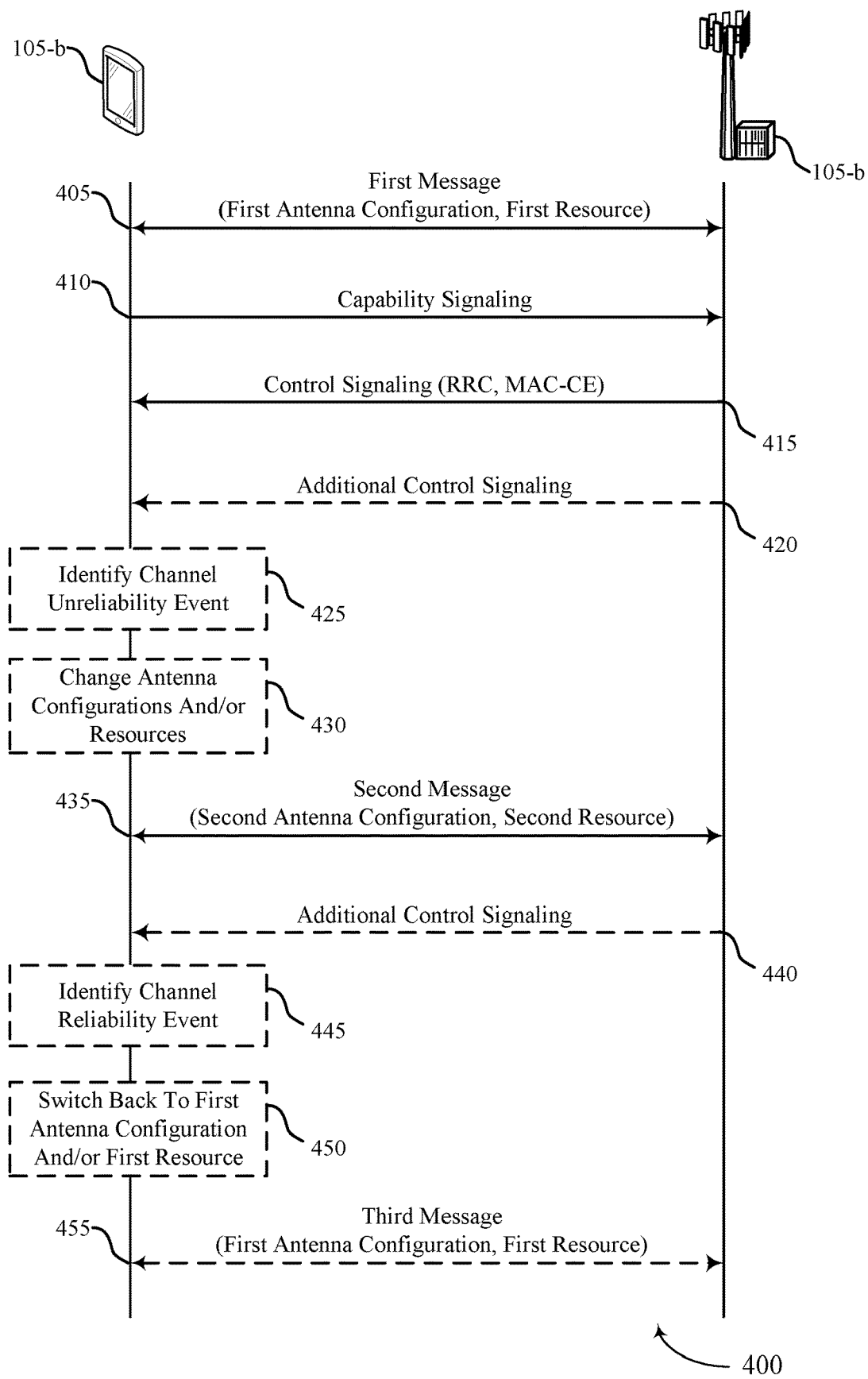
FIG. 4 illustrates an example of a process flow that supports techniques for adapting communications upon channel unreliability event in accordance with aspects of the present disclosure.

FIG. 4 illustrates an example of a process flow 400 that supports techniques for adapting communications upon channel unreliability event in accordance with aspects of the present disclosure. In some examples, process flow 400 may implement, or be implemented by, aspects of wireless communications system 100, wireless communications system 200, antenna configuration 300, or any combination thereof. For example, the process flow 400 may illustrate a UE 115-*b* communicating with a base station 105-*b* in accordance with a first antenna configuration and/or first set of resources, identifying a channel unreliability event, and communicating with the bases station 105-*b* in accordance with a second antenna configuration and/or second set of resources, as described with reference to FIGS. 1-3.

In some cases, process flow 400 may include a UE 115-*b* and a base station 105-*b*, which may be examples of corresponding devices as described herein. In particular, the UE 115-*b* and the base station 105-*b* illustrated in FIG. 6 may include examples of the UE 115-*a* and the base station 105-*a* illustrated in FIG. 2.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*b* may communicate a first message (or a first set of messages) with the base station 105-*b* in accordance with a first antenna configuration, a first set of resources, or both. For example, the UE 115-*b* may transmit or receive a first message using a first BWP. By way of another example, the UE 115-*b* may transmit or receive a first message using a first antenna configuration. The first antenna configuration may be associated with defined quantities of Tx and Rx antennas (e.g., xTyR antenna configuration), an antenna grouping configuration (e.g., xTzGyR antenna configuration), a first SRS repetition density, a first combination density, a first resource block pattern, a first sounding pattern (e.g., SRS sounding pattern), or any combination thereof.

At 410, the UE 115-*a* may transmit capability signaling (e.g., UE capability report) to the base station 105-*b*, where the capability signaling indicates a capability of the UE 115-*a* to adjust the first antenna configuration and/or the first set of resources for channel reliability management. In other words, the capability signaling may indicate that the UE 115-*b* is capable of dynamically adjusting an antenna configuration and/or resources at the UE 115-*a* to improve a reliability of communications performed via a channel between the UE 115-*a* and the base station 105-*b*. For example, the capability signaling may indicate that the UE 115-*b* is able to dynamically adjust the antenna configuration and/or resources at the UE 115-*a* in response to identified channel unreliability events. For instance, the UE 115-*a* may announce (via the capability signaling) that it is capable of switching from a low Tx/Rx antenna configuration (e.g., 1T2R) to a higher Tx/Rx antenna configuration (e.g., 2T4R) based on PDSCH decoding and/or identified channel unreliability events.

At 415, the UE 115-*a* may receive control signaling (e.g., RRC message, MAC-CE message, DCI message) from the base station 105-*b*. In some aspects, the control signaling may indicate one or more parameters for channel unreliability event detection associated with a downlink channel between the base station 105-*b* and the UE 115-*b*. In this regard, the control signaling may indicate parameters or characteristics for identifying channel unreliability events. In other words, the control signaling may configure one or more channel unreliability events which are to be monitored by the UE 115-*b* and/or base station 105-*b*.

For example, the control signaling may configure the UE 115-*b* to identify a channel unreliability event if the UE 115-*b* transmits M NACK messages in response to N downlink shared channel transmissions (e.g., PDSCH transmissions) scheduled by the base station 105-*b* within some time interval. In other words, the control signaling may configure the UE 115-*b* to identify a channel unreliability event if M NACK messages are observed (e.g., transmitted) within a period of N PDSCH transmissions. In this example, the quantity of NACK messages and the quantity of PDSCH transmissions (e.g., M and N, respectively), may be indicated via the control signaling, and may include parameters for channel unreliability event detection.

The control signaling may indicate any quantity of parameters for identifying one or more channel unreliability events. For example, the base station 105-*b* may configure the UE 115-*b* to identify channel unreliability events if the UE 115-*b* determines that one or more parameters associated with communications between the UE 115-*b* and the base station 105-*b* (e.g., BLER, SNR, SINR, CQI) satisfies one or more respective thresholds.

At 420, the UE 115-*b* may receive additional control signaling from the base station 105-*b*. The additional control signaling may indicate a second antenna configuration and/or a second set of resources which the UE 115-*b* is to switch to for channel reliability management. In other words, the additional control signaling (e.g., RRC message, MAC-CE message, DCI message) may indicate which antenna configuration and/or set of resources that the UE 115-*b* is to switch to upon identification of a channel unreliability event. The base station 105-*b* may be configured to transmit the additional control signaling based on (e.g., in response to) receiving the capability signaling at 410. Moreover, in some aspects, the additional control signaling at 420 may include a separate message or signaling as compared to the control signaling at 415. Additionally, or alternatively, the additional control signaling at 420 and the control signaling at 415 may include the same control signaling (e.g., same RRC or MAC-CE message).

At 425, the UE 115-*b* may identify a channel unreliability event. In particular, the UE 115-*b* may identify a channel unreliability event in accordance with the one or more parameters for channel unreliability event detection which were received via the control signaling at 415. In this regard, the UE 115-*b* may identify the channel unreliability event based on communicating the first message via the first antenna configuration and/or first set of resources at 405, transmitting the capability signaling at 410, receiving the control signaling at 415 and/or 420, or any combination thereof.

For example, the control signaling at 415 may configure the UE 115-*b* to identify a channel unreliability event if M NACK messages are observed (e.g., transmitted) within a period of N PDSCH transmissions, in which M and N are parameters for channel unreliability event detection. In this example, the UE 115-*b* may identify a channel unreliability event at 425 based on transmitting M NACK messages in response to N downlink shared channel transmissions scheduled by the base station 105-*b* within some time interval.

At 430, the UE 115-*b* may dynamically adjust the antenna configuration and/or set of resources at the UE 115-*b* to improve a reliability of wireless communications at the UE 115-*b* (e.g., for channel reliability management). For example, the UE 115-*b* may adjust from the first antenna configuration to a second antenna configuration, from the first set of resources to a second set of resources, or both. In particular, the UE 115-*b* may adjust the antenna configuration and/or set of resources at 430 based on (e.g., in response to) identifying the channel unreliability event at 425. In this regard, the UE 115-*b* may adjust the antenna configuration and/or set of resources at 430 based on communicating the first message via the first antenna configuration and/or first set of resources at 405, transmitting the capability signaling at 410, receiving the control signaling at 415 and/or 420, identifying the channel unreliability event at 425, or any combination thereof.

For example, the UE 115-*b* may change from the first antenna configuration to a second antenna configuration in order to improve a reliability of wireless communications at the UE 115-*b*. In some aspects, the UE 115-*b* may dynamically adjust from a lower Tx/Rx antenna configuration, such as 1T2R, to a higher Tx/Rx antenna configuration, such as 2T4R. Additionally, or alternatively, the UE 115-*b* may adjust from the first antenna configuration to a second antenna configuration which exhibits different parameters and/or improved reliability or efficiency as compared to the first antenna configuration. For example, the UE 115-*b* may adjust from the first antenna configuration to a second antenna configuration which exhibits a different antenna grouping configuration (e.g., xTzGyR antenna configuration), a different SRS repetition density, a different combination density, a different resource block pattern, a different sounding pattern (e.g., SRS sounding pattern), or any combination thereof.

By way of another example, the UE 115-*b* may perform a BWP switching procedure to switch from a first BWP (e.g., first set of resources) to a second BWP (e.g., second set of resources). In some cases, the UE 115-*b* may perform the BWP switching procedure to switch to a larger (e.g., wider) BWP which may enable more reliable wireless communications.

A relative timing for performing the BWP switching procedure may be pre-defined, signaled to the UE 115-*b* via the control signaling at 415, or both. For example, the control signaling may indicate a time interval (e.g., quantity of slots, symbols, or other TTIs) following identification of a channel unreliability event which the UE 115-*b* is to perform the BWP switching procedure. For instance, in cases where the controls signaling indicates that the UE 115-*b* is to switch BWPs ten symbols after identification of a channel unreliability event (e.g., Z=10), the UE 115-*b* may perform the BWP switching procedure at 430 ten symbols after identifying the channel unreliability event at 425. Further, in some aspects, the UE 115-*b* may indicate or suggest time offsets (e.g., Z values) for performance of BWP switching procedures which supports via the capability signaling at 410.

At 435, the UE 115-*b* may communicate a second message (or a second set of messages) with the base station 105-*b* in accordance with the second antenna configuration, the second set of resources, or both. For example, the UE 115-*b* may transmit or receive a second message using the second BWP based on performing the BWP switching procedure at 430. By way of another example, the UE 115-*b* may transmit or receive a second message using the second antenna configuration which the UE 115-*b* switched to at 430. In this regard, the UE 115-*b* may communicate the second message at 435 based on communicating the first message via the first antenna configuration and/or first set of resources at 405, transmitting the capability signaling at 410, receiving the control signaling at 415 and/or 420, identifying the channel unreliability event at 425, changing the antenna configuration and/or set or resources at 430, or any combination thereof.

At 440, the UE 115-*b* may receive additional control signaling from the base station 105-*b*. In some cases, the additional control signaling may indicate for the UE 115-*b* to switch back to the first antenna configuration (or default antenna configuration), the first set of resources (or a default set of resources), or both. In this regard, the additional control signaling (e.g., DCI message, MAC-CE message, RRC message) may trigger the UE 115-*b* to fallback to the first/default antenna configuration and/or the first/default set of resources which was used prior to identification of the channel unreliability event at 425 (e.g., trigger fallback to default BWP, xTyR antenna configuration, or xTzGyR antenna configuration).

Additionally, or alternatively, the additional control signaling at 440 may indicate a set of parameters for channel reliability event detection which may be used to trigger fallback to the first/default antenna configurations and/or resources. In other words, the base station 105-*b* may configure the UE 115-*b* (via the additional control signaling) to identify one or more cannel reliability events which will be used to trigger fallback to other antenna configurations and/or resources (e.g., trigger fallback to default BWP, xTyR antenna configuration, or xTzGyR antenna configuration). For example, the additional control signaling may configure the UE 115-*b* to identify a channel reliability event if K ACK messages (e.g., K quantity/integer of positive ACK messages) are transmitted in response to N transmissions scheduled by the base station 105-*b* within some time interval. In this example, the values for K and N may be indicated via the additional control signaling at 440, and may include parameters for channel reliability event detection. In some cases, the parameters for identifying channel reliability events may be transmitted in the control signaling at 415 and/or the additional control signaling at 420.

At 445, the UE 115-*b* may identify a channel reliability event associated with a channel (e.g., downlink channel, uplink channel) between the UE 115-*b* and the base station 105-*b*. In some cases, the UE 115-*b* may identify the channel reliability event based on (e.g., in accordance with) the parameters for channel reliability event detection which were indicated via the additional control signaling at 440. For example, as noted previously herein, the additional control signaling may indicate K and values for channel reliability event detection. In this example, the UE 115-*b* may identify a channel reliability event based on transmitting K positive ACK messages in response to N PDSCH transmissions scheduled by the base station 105-*b* within some time interval.

At 450, the UE 115-*b* may switch back to the first antenna configuration (or a default antenna configuration), the first set of resources (or a default set of resources), or both. In other words, the UE 115-*b* may fallback to the first/default antenna configuration and/or first/default set of resources. As noted previously herein, the UE 115-*b* may fallback to the first and/or default set of resources by performing a BWP switching procedure. In particular, the UE 115-*b* may switch back to the first antenna configuration and/or first set of resources based on explicit signaling from the bases station 105-*b*, based on identification of a channel reliability event, or both.

For instance, the additional control signaling receive at 440 may include an explicit indication for the UE 115-*a* to fallback to the first antenna configuration and/or first set of resources, and the UE 115-*b* may switch to the first antenna configuration and/or the first set of resources based on the additional control signaling received at 440. In other cases, the additional control signaling at 440 may indicate parameters for channel reliability event detection. In this example, the UE 115-*b* may fallback to the first antenna configuration and/or first set of resources based on identifying a channel reliability event at 445 in accordance with the configured parameters. In additional or alternative cases, the UE 115-*b* may fallback to the first antenna configuration and/or the first set of resources based on an expiration of one or more timers (e.g., expiration of a timer which was initiated upon switching to the second antenna configuration and/or second set of resources).

At 435, the UE 115-*b* may communicate a third message (or a third set of messages) with the base station 105-*b* in accordance with the first (or default) antenna configuration, the first (or default) set of resources, or both. In particular, the UE 115-*b* may communicate the third message using the first antenna configuration and/or first set of resources based on falling back to the first antenna configuration and/or first set of resources at 450.

Figure 5:
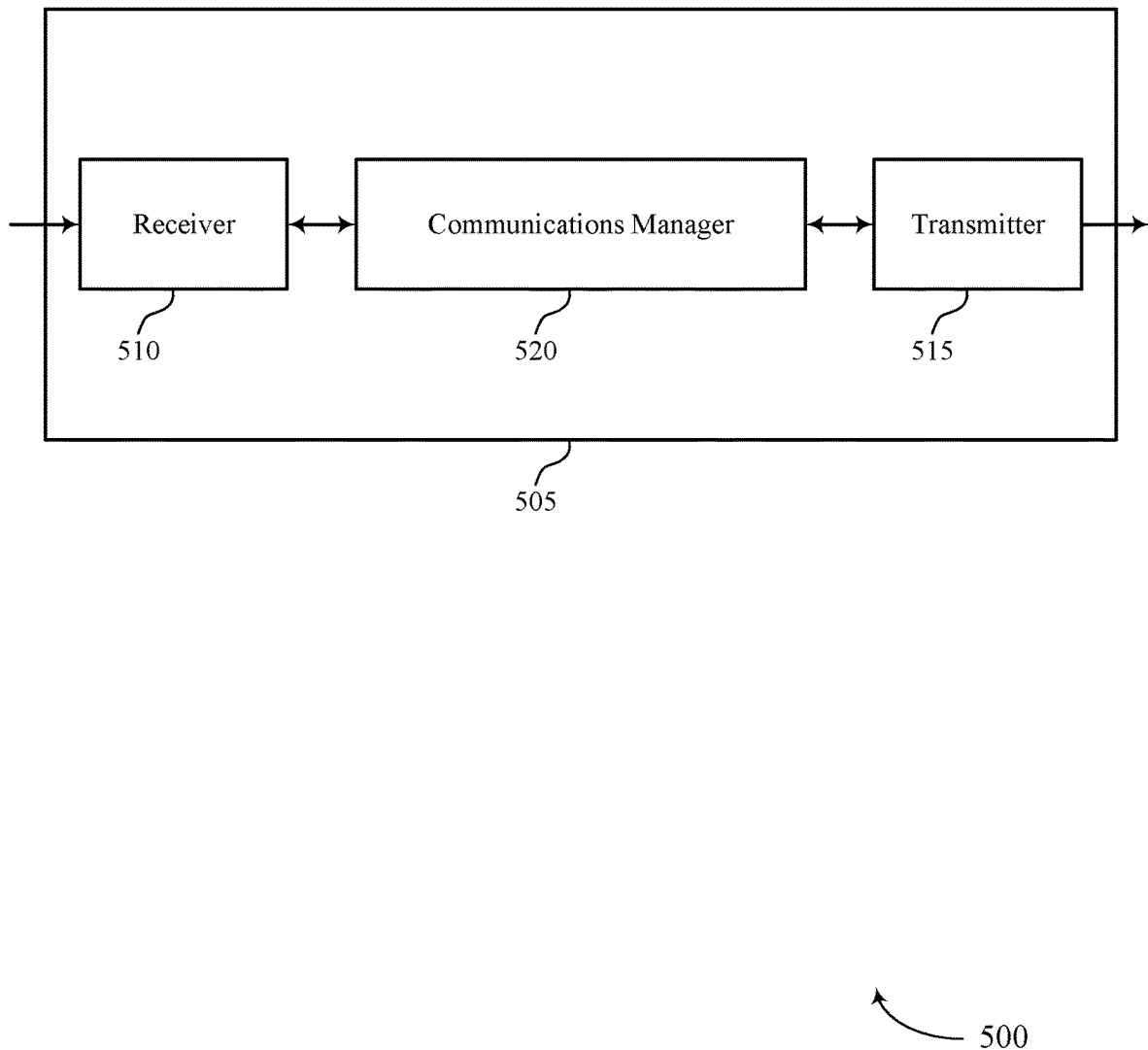
FIGS. 5 and 6 show block diagrams of devices that support techniques for adapting communications upon channel unreliability event in accordance with aspects of the present disclosure.

FIG. 5 shows a block diagram 500 of a device 505 that supports techniques for adapting communications upon channel unreliability event in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for adapting communications upon channel unreliability event). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for adapting communications upon channel unreliability event). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for adapting communications upon channel unreliability event as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for communicating one or more messages with a base station in accordance with a first antenna configuration, a first set of resources, or both. The communications manager 520 may be configured as or otherwise support a means for transmitting, to the base station, capability signaling indicating a capability of the UE to adjust the first antenna configuration, the first set of resources, or both, for channel reliability management. The communications manager 520 may be configured as or otherwise support a means for receiving, from the base station based on the capability signaling, control signaling indicating one or more parameters for channel unreliability event detection associated with a downlink channel between the base station and the UE. The communications manager 520 may be configured as or otherwise support a means for communicating one or more additional messages with the base station in accordance with a second antenna configuration, a second set of resources, or both, based on a channel unreliability event detected in accordance with the one or more parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques which may improve a reliability of wireless communications within the wireless communications system 100 while simultaneously reducing power consumption at the UE 115. In particular, techniques described herein may enable UEs 115 to communicate with the network using less power-intensive antenna configurations and/or resources, and may enable the UEs 115 to switch to more reliable (and more power-intensive) antenna configurations and/or resources upon identification of a channel reliability event. Accordingly, techniques descried herein may reduce an overall power consumption at the UE 115, and may enable for more reliable wireless communications with the network upon identification of a channel unreliability event.

Figure 6:
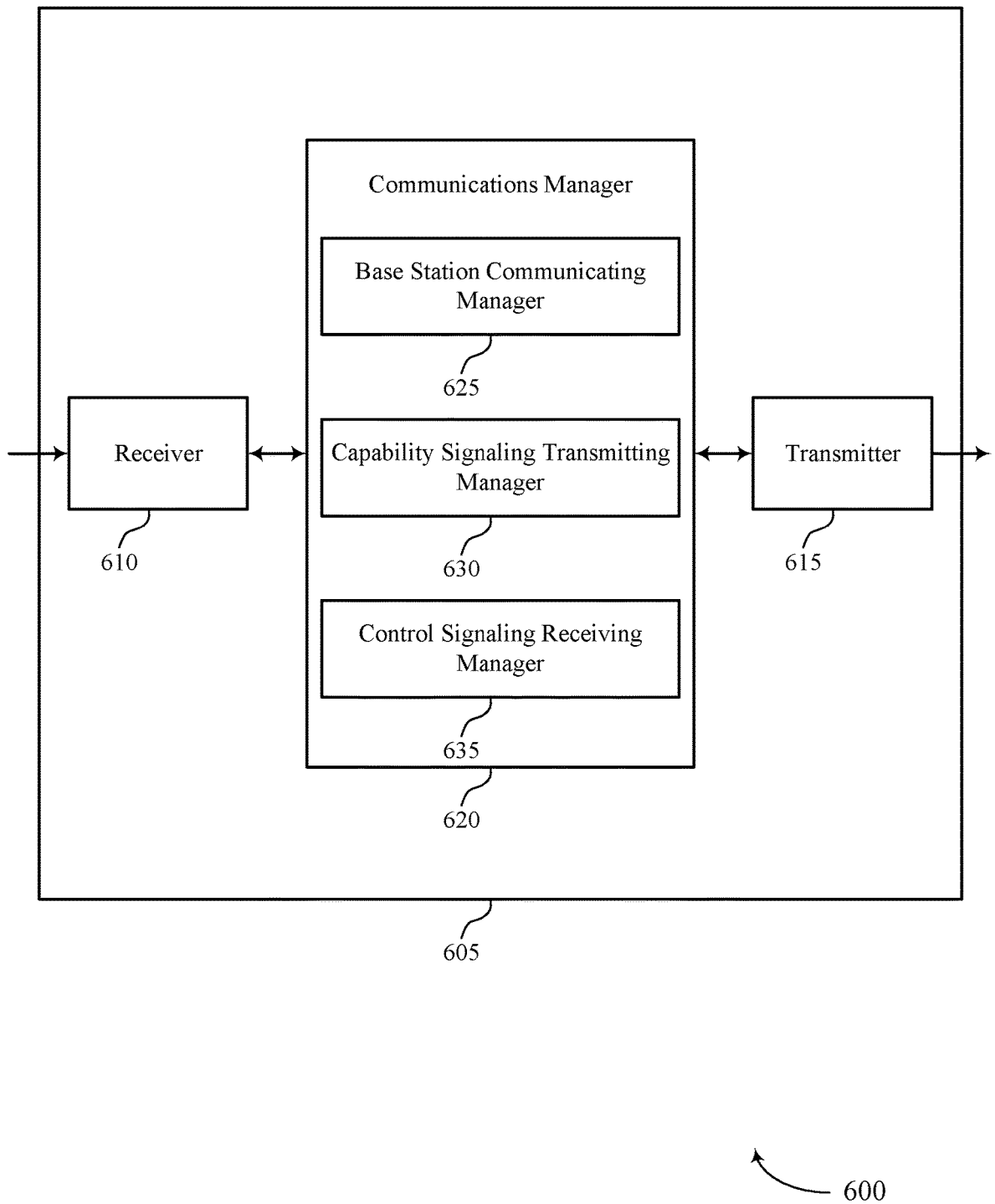

FIG. 6 shows a block diagram 600 of a device 605 that supports techniques for adapting communications upon channel unreliability event in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for adapting communications upon channel unreliability event). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for adapting communications upon channel unreliability event). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for adapting communications upon channel unreliability event as described herein. For example, the communications manager 620 may include a base station communicating manager 625, a capability signaling transmitting manager 630, a control signaling receiving manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The base station communicating manager 625 may be configured as or otherwise support a means for communicating one or more messages with a base station in accordance with a first antenna configuration, a first set of resources, or both. The capability signaling transmitting manager 630 may be configured as or otherwise support a means for transmitting, to the base station, capability signaling indicating a capability of the UE to adjust the first antenna configuration, the first set of resources, or both, for channel reliability management. The control signaling receiving manager 635 may be configured as or otherwise support a means for receiving, from the base station based on the capability signaling, control signaling indicating one or more parameters for channel unreliability event detection associated with a downlink channel between the base station and the UE. The base station communicating manager 625 may be configured as or otherwise support a means for communicating one or more additional messages with the base station in accordance with a second antenna configuration, a second set of resources, or both, based on a channel unreliability event detected in accordance with the one or more parameters.

Figure 7:
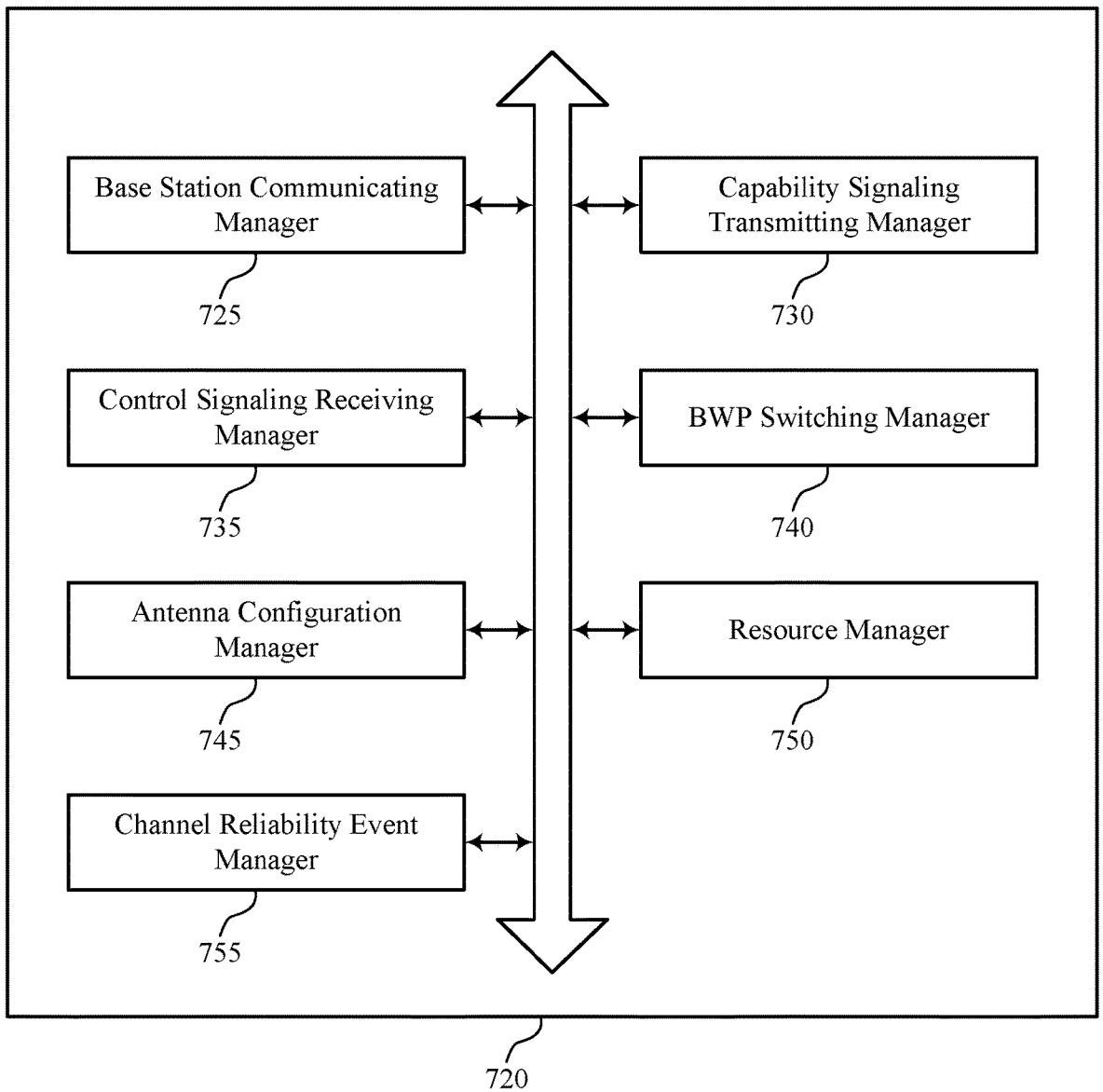
FIG. 7 shows a block diagram of a communications manager that supports techniques for adapting communications upon channel unreliability event in accordance with aspects of the present disclosure.

FIG. 7 shows a block diagram 700 of a communications manager 720 that supports techniques for adapting communications upon channel unreliability event in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for adapting communications upon channel unreliability event as described herein. For example, the communications manager 720 may include a base station communicating manager 725, a capability signaling transmitting manager 730, a control signaling receiving manager 735, a BWP switching manager 740, an antenna configuration manager 745, a resource manager 750, a channel reliability event manager 755, or any combination thereof. Each of these components may communicate, directly or indirectly, with one another (e.g., via one or more buses).

The communications manager 720 may support wireless communication at a UE in accordance with examples as disclosed herein. The base station communicating manager 725 may be configured as or otherwise support a means for communicating one or more messages with a base station in accordance with a first antenna configuration, a first set of resources, or both. The capability signaling transmitting manager 730 may be configured as or otherwise support a means for transmitting, to the base station, capability signaling indicating a capability of the UE to adjust the first antenna configuration, the first set of resources, or both, for channel reliability management. The control signaling receiving manager 735 may be configured as or otherwise support a means for receiving, from the base station based on the capability signaling, control signaling indicating one or more parameters for channel unreliability event detection associated with a downlink channel between the base station and the UE. In some examples, the base station communicating manager 725 may be configured as or otherwise support a means for communicating one or more additional messages with the base station in accordance with a second antenna configuration, a second set of resources, or both, based on a channel unreliability event detected in accordance with the one or more parameters.

In some examples, the control signaling receiving manager 735 may be configured as or otherwise support a means for receiving, via the control signaling, an indication of a quantity of NACK messages and a quantity of downlink shared channel transmissions, where the one or more parameters include the quantity of NACK messages and the quantity of downlink shared channel transmissions, where the channel unreliability event is detected based on transmitting the quantity of NACK messages for the quantity of downlink shared channel transmissions scheduled by the base station.

In some examples, the capability signaling transmitting manager 730 may be configured as or otherwise support a means for transmitting, to the base station via the capability signaling, an indication of a set of multiple antenna configurations, a set of multiple sets of resources, or both, to which the UE may switch to upon detection of the channel unreliability event, where the second antenna configuration is included within the set of multiple antenna configurations, and where the second set of resources is included within the set of multiple sets of resources.

In some examples, the control signaling receiving manager 735 may be configured as or otherwise support a means for receiving, from the base station based on the capability signaling, additional control signaling indicating the second antenna configuration, an indication of the second set of resources, or both, where communicating the one or more additional messages in accordance with the second antenna configuration, the second set of resources, or both, is based on the additional control signaling.

In some examples, the first antenna configuration is associated with a first set of transmit antennas and a first set of receive antennas at the UE. In some examples, the second antenna configuration is associated with a second set of transmit antennas and a second set of receive antennas at the UE. In some examples, at least one of the second set of transmit antennas and the second set of receive antennas is different from the first set of transmit antennas and the first set of receive antennas, respectively.

In some examples, the second set of receive antennas includes more receive antennas relative to the first set of receive antennas, the second set of transmit antennas includes more transmit antennas relative to the first set of transmit antennas, or both. In some examples, the second set of receive antennas includes each receive antenna at the UE. In some examples, the second set of transmit antennas includes each transmit antenna at the UE, or both. In some examples, the second antenna configuration is associated with full antenna sounding at the UE.

In some examples, the second set of resources includes a second BWP which is larger than the first BWP, and the BWP switching manager 740 may be configured as or otherwise support a means for performing a BWP switching procedure from the first BWP to the second BWP based on the identification of the channel unreliability event, where communicating the one or more messages with the base station in accordance with the second antenna configuration, the second set of resources, or both, is based on performing the BWP switching procedure.

In some examples, the BWP switching manager 740 may be configured as or otherwise support a means for receiving, via the control signaling, an indication of a time interval for performing BWP switching procedures, the one or more parameters indicating the time interval, where the BWP switching procedure is performed during a time period that occurs subsequent to the identification of the channel unreliability event which is greater than or equal to the time interval. In some examples, the BWP switching manager 740 may be configured as or otherwise support a means for transmitting, via the capability signaling, an indication of one or more time intervals supported by the UE, the one or more time intervals including the time interval.

In some examples, the first set of resources includes a first resource block pattern, a first sounding pattern, or both. In some examples, the second set of resources includes a second resource block pattern, a second sounding pattern, or both. In some examples, the first antenna configuration includes a first combination density, and the second antenna configuration includes a second combination density which is greater than the first combination density. In some examples, the first antenna configuration includes a first SRS repetition density, and the second antenna configuration includes a second SRS repetition density which is greater than the first SRS repetition density.

In some examples, the antenna configuration manager 745 may be configured as or otherwise support a means for receiving, via the control signaling, an indication of an antenna grouping configuration which allocates a set of multiple antennas of the UE into one or more sounding groups, where communicating the one or more additional messages with the base station in accordance with the second antenna configuration, the second set of resources, or both, includes communicating in accordance with the antenna grouping configuration.

In some examples, the antenna configuration manager 745 may be configured as or otherwise support a means for transmitting, via the capability signaling, an indication of a set of multiple antenna grouping configurations supported by the UE, where the antenna grouping configuration is included within the set of multiple antenna grouping configurations.

In some examples, the resource manager 750 may be configured as or otherwise support a means for receiving, via the control signaling, an indication of the second set of resources, where communicating the one or more additional messages with the base station in accordance with the second set of resources is based on receiving the indication of the second set of resources.

In some examples, the control signaling receiving manager 735 may be configured as or otherwise support a means for receiving additional control signaling from the base station. In some examples, the base station communicating manager 725 may be configured as or otherwise support a means for communicating with the base station in accordance with the first antenna configuration, the first set of resources, or both, based on receiving the additional control signaling.

In some examples, the channel reliability event manager 755 may be configured as or otherwise support a means for communicating with the base station in accordance with the first antenna configuration, the first set of resources, or both, based on an identification of a channel reliability event associated with the downlink channel between the base station and the UE. In some examples, the channel reliability event manager 755 may be configured as or otherwise support a means for receiving, via the control signaling, an indication of one or more additional parameters for channel reliability event detection, where the channel reliability event is detected in accordance with the one or more additional parameters.

In some examples, the channel reliability event manager 755 may be configured as or otherwise support a means for receiving, via the control signaling, an indication of a quantity of positive ACK messages and a quantity of downlink shared channel transmissions, where the one or more parameters include the quantity of positive ACK messages and the quantity of downlink shared channel transmissions, where the channel reliability event is identified based on transmitting the quantity of positive ACK messages for the quantity of downlink shared channel transmissions scheduled by the base station. In some examples, the control signaling includes a RRC message, a MAC-CE message, or both.

Figure 8:
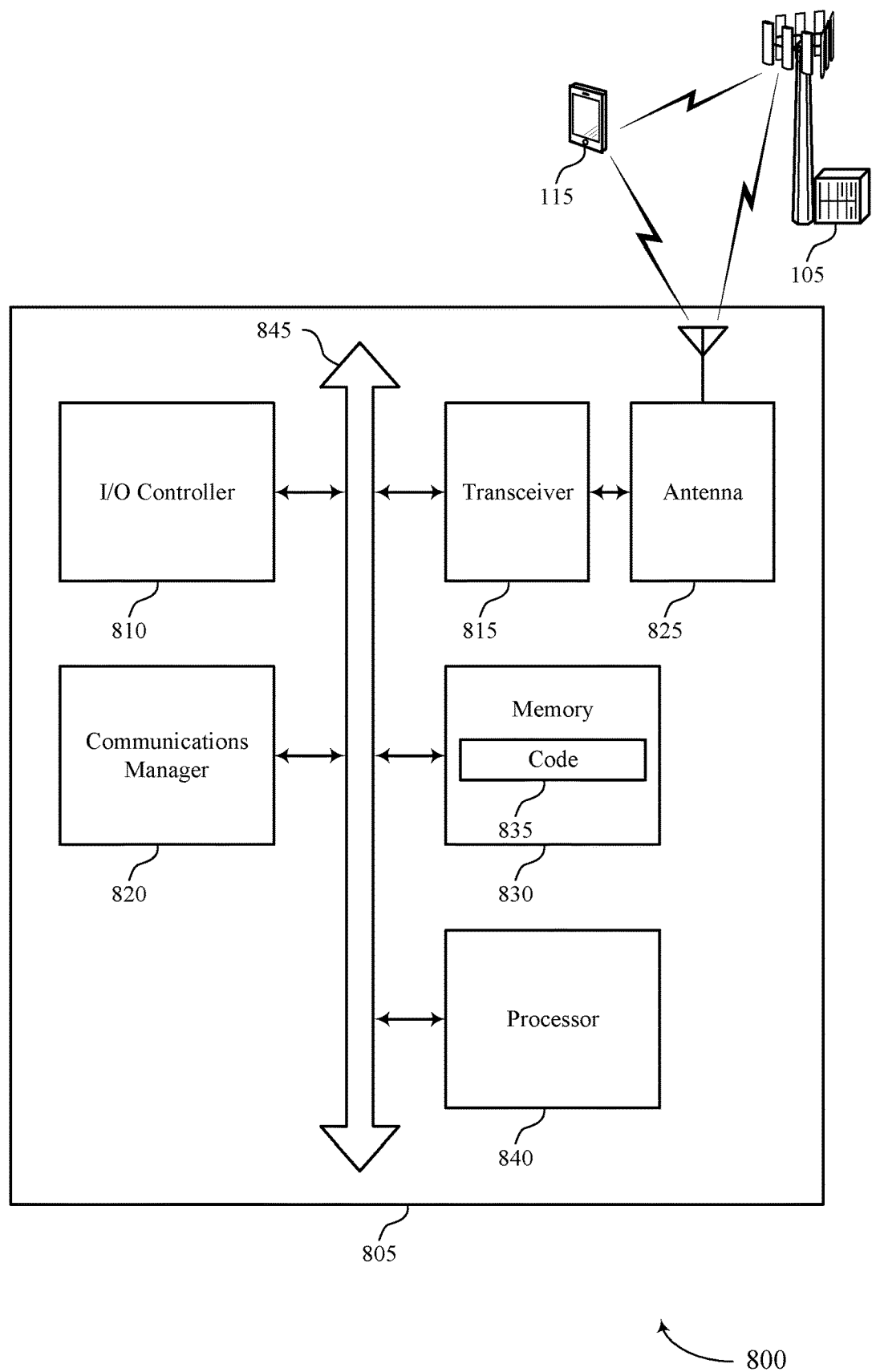
FIG. 8 shows a diagram of a system including a device that supports techniques for adapting communications upon channel unreliability event in accordance with aspects of the present disclosure.

FIG. 8 shows a diagram of a system 800 including a device 805 that supports techniques for adapting communications upon channel unreliability event in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for adapting communications upon channel unreliability event). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for communicating one or more messages with a base station in accordance with a first antenna configuration, a first set of resources, or both. The communications manager 820 may be configured as or otherwise support a means for transmitting, to the base station, capability signaling indicating a capability of the UE to adjust the first antenna configuration, the first set of resources, or both, for channel reliability management. The communications manager 820 may be configured as or otherwise support a means for receiving, from the base station based on the capability signaling, control signaling indicating one or more parameters for channel unreliability event detection associated with a downlink channel between the base station and the UE. The communications manager 820 may be configured as or otherwise support a means for communicating one or more additional messages with the base station in accordance with a second antenna configuration, a second set of resources, or both, based on a channel unreliability event detected in accordance with the one or more parameters.

By including or configuring the communications manager 820 in accordance with examples as described herein, the device 805 may support techniques which may improve a reliability of wireless communications within the wireless communications system 100 while simultaneously reducing power consumption at the UE 115. In particular, techniques described herein may enable UEs 115 to communicate with the network using less power-intensive antenna configurations and/or resources, and may enable the UEs 115 to switch to more reliable (and more power-intensive) antenna configurations and/or resources upon identification of a channel reliability event. Accordingly, techniques descried herein may reduce an overall power consumption at the UE 115, and may enable for more reliable wireless communications with the network upon identification of a channel unreliability event.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for adapting communications upon channel unreliability event as described herein, or the processor 840 and the memory 830 may be otherwise configured to perform or support such operations.

Figure 9:
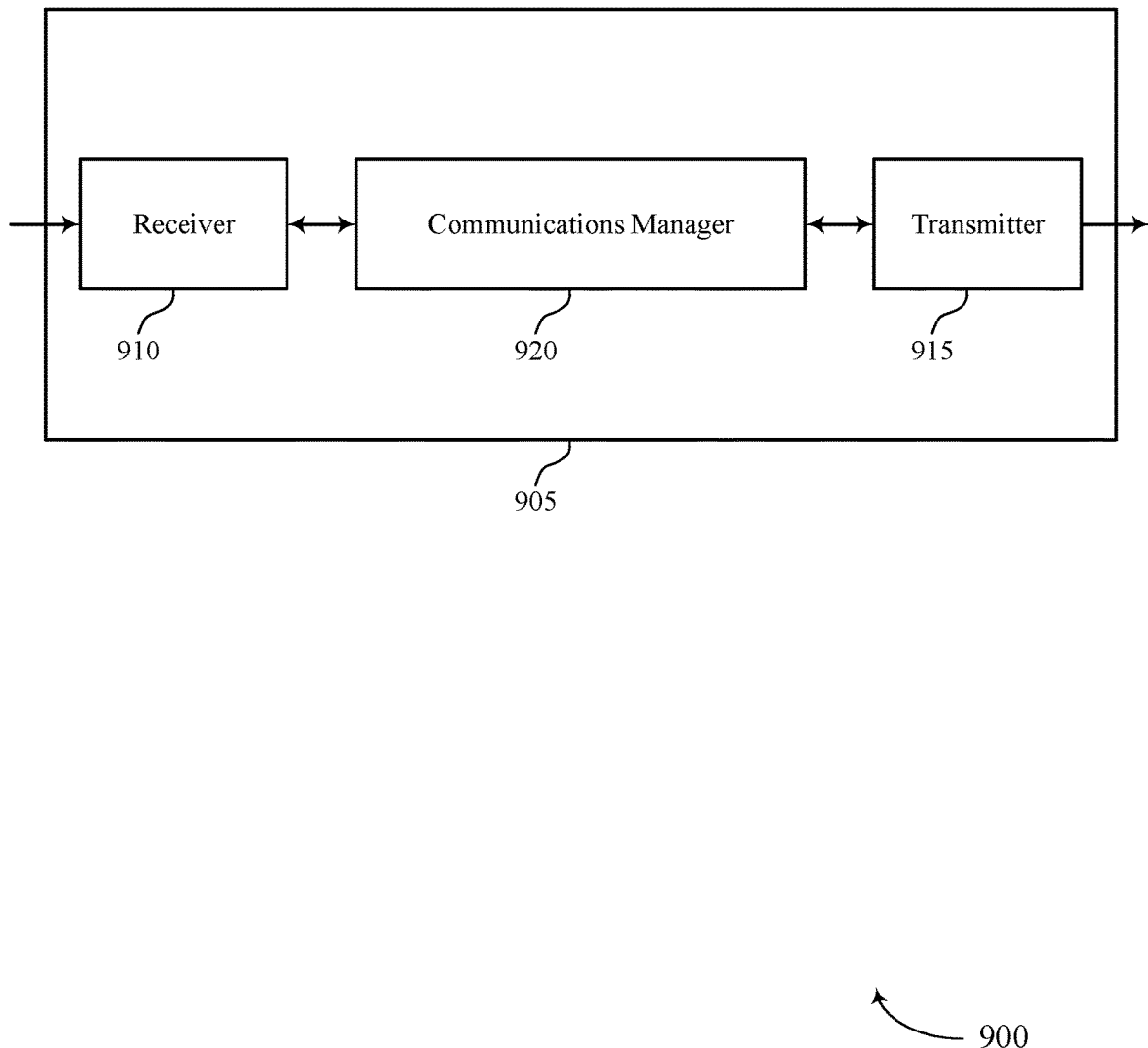
FIGS. 9 and 10 show block diagrams of devices that support techniques for adapting communications upon channel unreliability event in accordance with aspects of the present disclosure.

FIG. 9 shows a block diagram 900 of a device 905 that supports techniques for adapting communications upon channel unreliability event in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for adapting communications upon channel unreliability event). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for adapting communications upon channel unreliability event). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for adapting communications upon channel unreliability event as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for communicating one or more messages with a UE in accordance with a first antenna configuration at the UE, a first set of resources, or both. The communications manager 920 may be configured as or otherwise support a means for receiving, from the UE, capability signaling indicating a capability of the UE to adjust the first antenna configuration, the first set of resources, or both, for channel reliability management. The communications manager 920 may be configured as or otherwise support a means for transmitting, to the UE based on the capability signaling, control signaling indicating one or more parameters for channel unreliability event detection associated with a downlink channel between the base station and the UE. The communications manager 920 may be configured as or otherwise support a means for communicating one or more additional messages with the UE in accordance with a second antenna configuration at the UE, a second set of resources, or both, based on a channel unreliability event detected in accordance with the one or more parameters.

By including or configuring the communications manager 920 in accordance with examples as described herein, the device 905 (e.g., a processor controlling or otherwise coupled to the receiver 910, the transmitter 915, the communications manager 920, or a combination thereof) may support techniques which may improve a reliability of wireless communications within the wireless communications system 100 while simultaneously reducing power consumption at the UE 115. In particular, techniques described herein may enable UEs 115 to communicate with the network using less power-intensive antenna configurations and/or resources, and may enable the UEs 115 to switch to more reliable (and more power-intensive) antenna configurations and/or resources upon identification of a channel reliability event. Accordingly, techniques descried herein may reduce an overall power consumption at the UE 115, and may enable for more reliable wireless communications with the network upon identification of a channel unreliability event.

Figure 10:
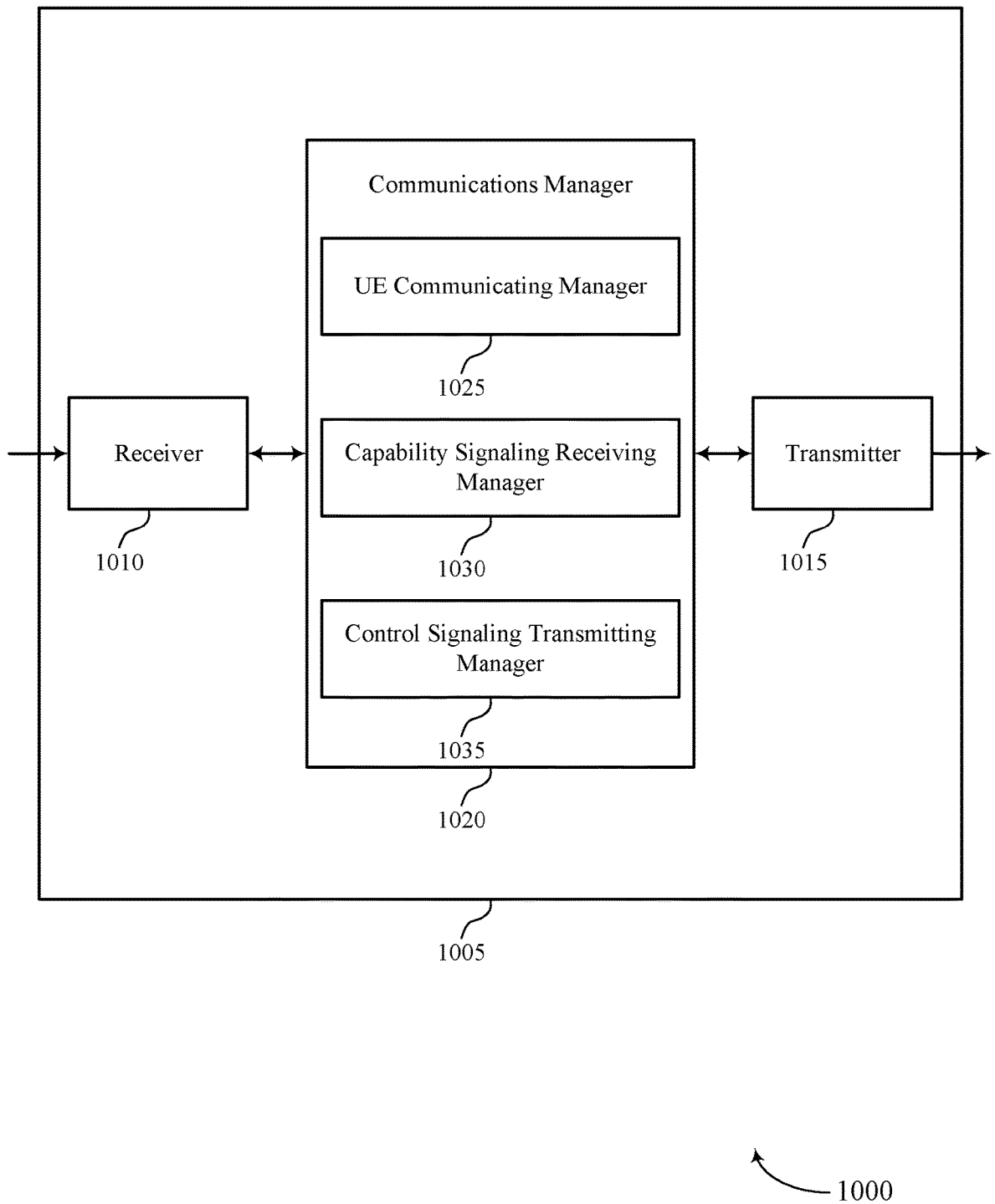

FIG. 10 shows a block diagram 1000 of a device 1005 that supports techniques for adapting communications upon channel unreliability event in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for adapting communications upon channel unreliability event). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for adapting communications upon channel unreliability event). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for adapting communications upon channel unreliability event as described herein. For example, the communications manager 1020 may include a UE communicating manager 1025, a capability signaling receiving manager 1030, a control signaling transmitting manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The UE communicating manager 1025 may be configured as or otherwise support a means for communicating one or more messages with a UE in accordance with a first antenna configuration at the UE, a first set of resources, or both. The capability signaling receiving manager 1030 may be configured as or otherwise support a means for receiving, from the UE, capability signaling indicating a capability of the UE to adjust the first antenna configuration, the first set of resources, or both, for channel reliability management. The control signaling transmitting manager 1035 may be configured as or otherwise support a means for transmitting, to the UE based on the capability signaling, control signaling indicating one or more parameters for channel unreliability event detection associated with a downlink channel between the base station and the UE. The UE communicating manager 1025 may be configured as or otherwise support a means for communicating one or more additional messages with the UE in accordance with a second antenna configuration at the UE, a second set of resources, or both, based on a channel unreliability event detected in accordance with the one or more parameters.

Figure 11:
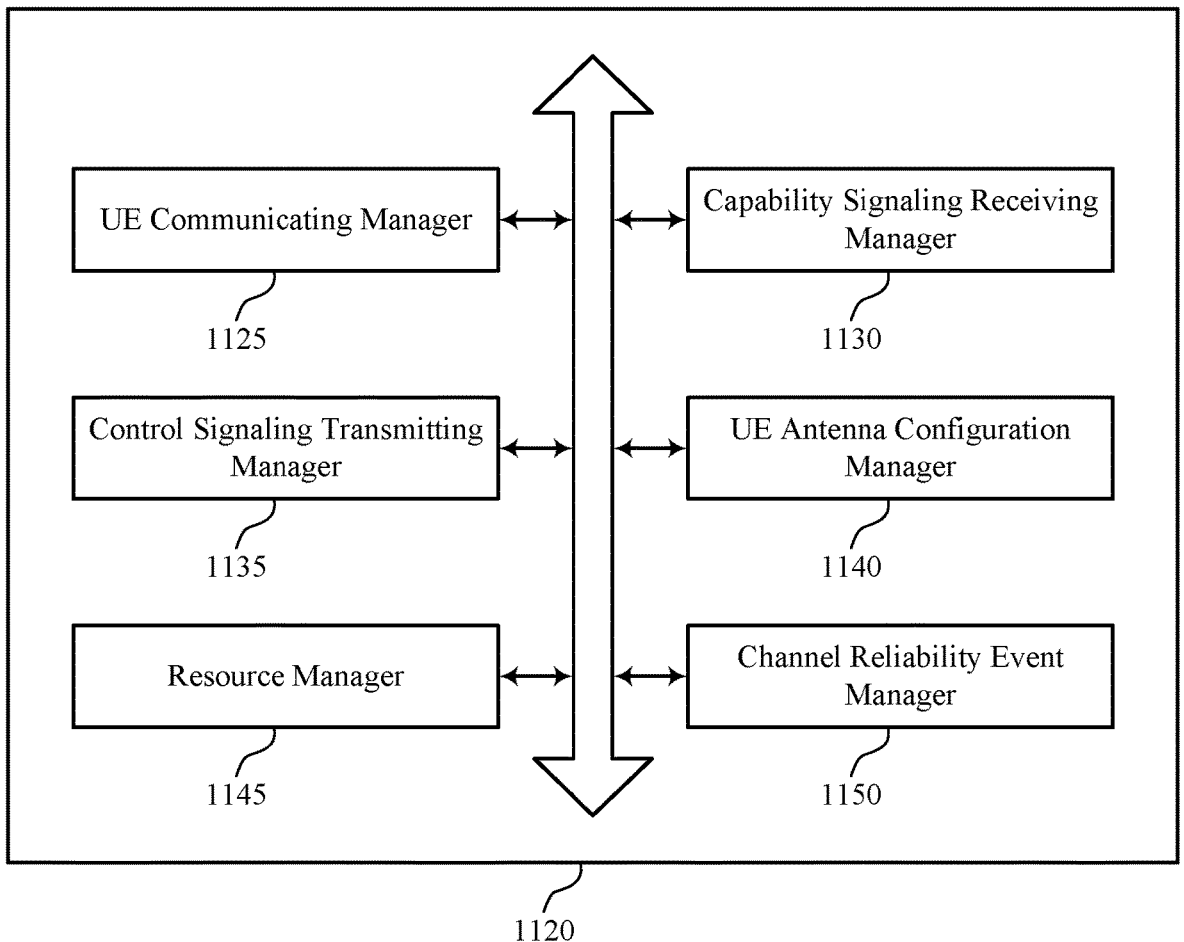
FIG. 11 shows a block diagram of a communications manager that supports techniques for adapting communications upon channel unreliability event in accordance with aspects of the present disclosure.

FIG. 11 shows a block diagram 1100 of a communications manager 1120 that supports techniques for adapting communications upon channel unreliability event in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for adapting communications upon channel unreliability event as described herein. For example, the communications manager 1120 may include a UE communicating manager 1125, a capability signaling receiving manager 1130, a control signaling transmitting manager 1135, a UE antenna configuration manager 1140, a resource manager 1145, a channel reliability event manager 1150, or any combination thereof. Each of these components may communicate, directly or indirectly, with one another (e.g., via one or more buses).

The communications manager 1120 may support wireless communication at a base station in accordance with examples as disclosed herein. The UE communicating manager 1125 may be configured as or otherwise support a means for communicating one or more messages with a UE in accordance with a first antenna configuration at the UE, a first set of resources, or both. The capability signaling receiving manager 1130 may be configured as or otherwise support a means for receiving, from the UE, capability signaling indicating a capability of the UE to adjust the first antenna configuration, the first set of resources, or both, for channel reliability management. The control signaling transmitting manager 1135 may be configured as or otherwise support a means for transmitting, to the UE based on the capability signaling, control signaling indicating one or more parameters for channel unreliability event detection associated with a downlink channel between the base station and the UE. In some examples, the UE communicating manager 1125 may be configured as or otherwise support a means for communicating one or more additional messages with the UE in accordance with a second antenna configuration at the UE, a second set of resources, or both, based on a channel unreliability event detected in accordance with the one or more parameters.

In some examples, the control signaling transmitting manager 1135 may be configured as or otherwise support a means for transmitting, via the control signaling, an indication of a quantity of NACK messages and a quantity of downlink shared channel transmissions, where the one or more parameters include the quantity of NACK messages and the quantity of downlink shared channel transmissions, where the channel unreliability event is detected based on receiving the quantity of NACK messages for the quantity of downlink shared channel transmissions scheduled by the base station.

In some examples, the capability signaling receiving manager 1130 may be configured as or otherwise support a means for receiving, from the UE via the capability signaling, an indication of a set of multiple antenna configurations, a set of multiple sets of resources, or both, to which the UE may switch to upon detection of the channel unreliability event, where the second antenna configuration is included within the set of multiple antenna configurations, and where the second set of resources is included within the set of multiple sets of resources.

In some examples, the control signaling transmitting manager 1135 may be configured as or otherwise support a means for transmitting, to the UE based on the capability signaling, additional control signaling indicating the second antenna configuration, an indication of the second set of resources, or both, where communicating the one or more additional messages in accordance with the second antenna configuration, the second set of resources, or both, is based on the additional control signaling.

In some examples, the first antenna configuration is associated with a first set of transmit antennas and a first set of receive antennas at the UE. In some examples, the second antenna configuration is associated with a second set of transmit antennas and a second set of receive antennas at the UE. In some examples, at least one of the second set of transmit antennas and the second set of receive antennas is different from the first set of transmit antennas and the first set of receive antennas, respectively.

In some examples, the second set of receive antennas includes more receive antennas relative to the first set of receive antennas, the second set of transmit antennas includes more transmit antennas relative to the first set of transmit antennas, or both. In some examples, the second set of receive antennas includes each receive antenna at the UE. In some examples, the second set of transmit antennas includes each transmit antenna at the UE, or both. In some examples, the second antenna configuration is associated with full antenna sounding at the UE.

In some examples, the control signaling transmitting manager 1135 may be configured as or otherwise support a means for transmitting, via the control signaling, an indication of a time interval for performing BWP switching procedures at the UE, the one or more parameters indicating the time interval, where communicating the one or more additional messages in accordance with the second set of resources, or both, is based on the time interval.

In some examples, the capability signaling receiving manager 1130 may be configured as or otherwise support a means for receiving, via the capability signaling, an indication of one or more time intervals supported by the UE, the one or more time intervals including the time interval.

In some examples, the first set of resources includes a first resource block pattern, a first sounding pattern, or both. In some examples, the second set of resources includes a second resource block pattern, a second sounding pattern, or both. In some examples, the first antenna configuration includes a first combination density, and the second antenna configuration includes a second combination density which is greater than the first combination density. In some examples, the first antenna configuration includes a first SRS repetition density, and the second antenna configuration includes a second SRS repetition density which is greater than the first SRS repetition density.

In some examples, the UE antenna configuration manager 1140 may be configured as or otherwise support a means for transmitting, via the control signaling, an indication of an antenna grouping configuration which allocates a set of multiple antennas of the UE into one or more sounding groups, where communicating the one or more additional messages with the UE in accordance with the second antenna configuration, the second set of resources, or both, includes communicating in accordance with the antenna grouping configuration. In some examples, the UE antenna configuration manager 1140 may be configured as or otherwise support a means for receiving, via the capability signaling, an indication of a set of multiple antenna grouping configurations supported by the UE, where the antenna grouping configuration is included within the set of multiple antenna grouping configurations.

In some examples, the resource manager 1145 may be configured as or otherwise support a means for transmitting, via the control signaling, an indication of the second set of resources, where communicating the one or more additional messages with the UE in accordance with the second set of resources is based on transmitting the indication of the second set of resources.

In some examples, the control signaling transmitting manager 1135 may be configured as or otherwise support a means for transmitting additional control signaling to the UE. In some examples, the UE communicating manager 1125 may be configured as or otherwise support a means for communicating with the UE in accordance with the first antenna configuration, the first set of resources, or both, based on transmitting the additional control signaling.

In some examples, the channel reliability event manager 1150 may be configured as or otherwise support a means for communicating with the UE in accordance with the first antenna configuration, the first set of resources, or both, based on an identification of a channel reliability event associated with the downlink channel between the base station and the UE. In some examples, the channel reliability event manager 1150 may be configured as or otherwise support a means for transmitting, via the control signaling, an indication of one or more additional parameters for channel reliability event detection, where the channel reliability event is detected in accordance with the one or more additional parameters.

In some examples, the channel reliability event manager 1150 may be configured as or otherwise support a means for transmitting, via the control signaling, an indication of a quantity of positive ACK messages and a quantity of downlink shared channel transmissions, where the one or more parameters include the quantity of positive ACK messages and the quantity of downlink shared channel transmissions, where the channel reliability event is identified based on receiving the quantity of positive ACK messages for the quantity of downlink shared channel transmissions scheduled by the base station. In some examples, the control signaling includes a RRC message, a MAC-CE message, or both.

Figure 12:
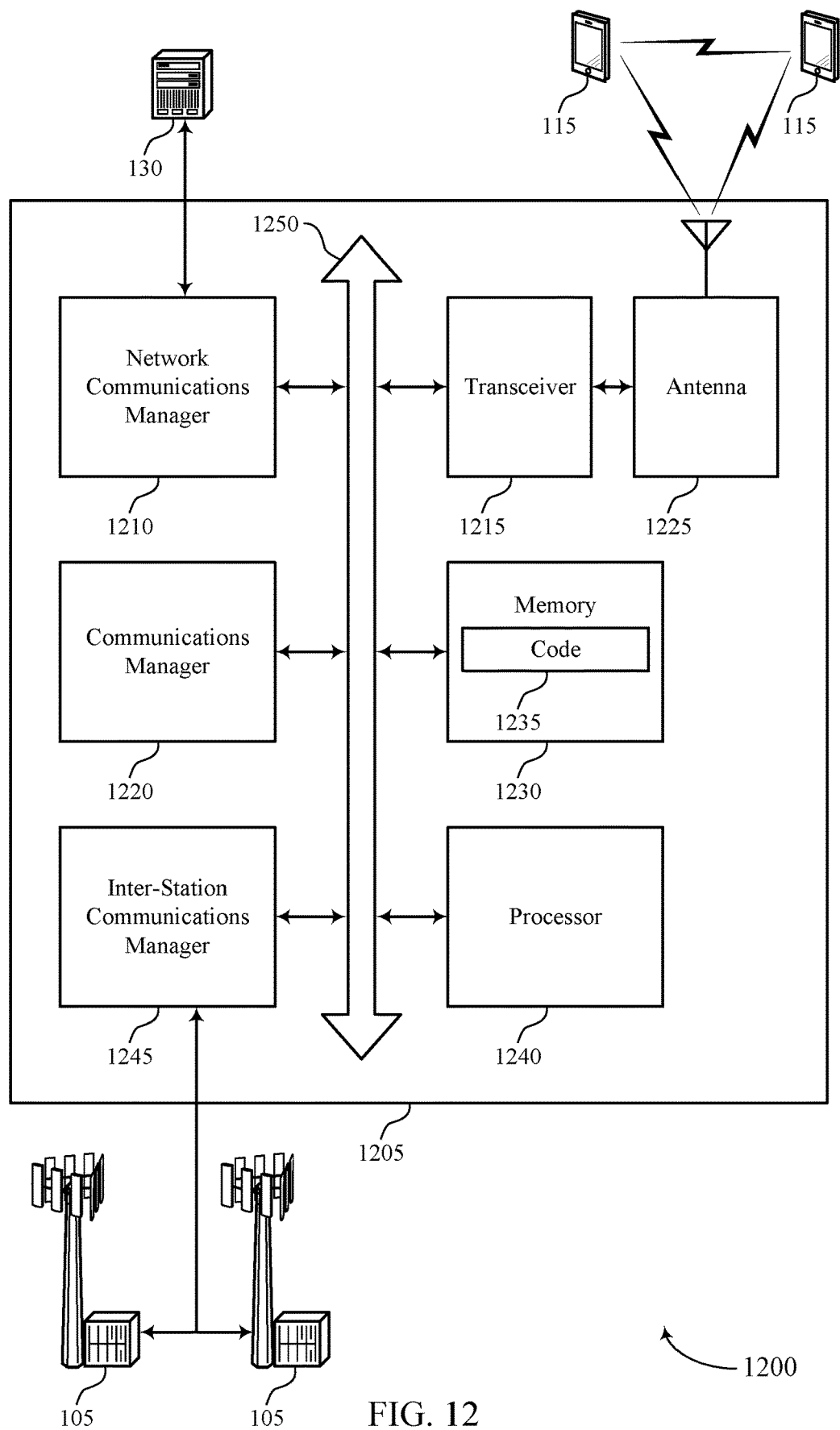
FIG. 12 shows a diagram of a system including a device that supports techniques for adapting communications upon channel unreliability event in accordance with aspects of the present disclosure.

FIG. 12 shows a diagram of a system 1200 including a device 1205 that supports techniques for adapting communications upon channel unreliability event in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for adapting communications upon channel unreliability event). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for communicating one or more messages with a UE in accordance with a first antenna configuration at the UE, a first set of resources, or both. The communications manager 1220 may be configured as or otherwise support a means for receiving, from the UE, capability signaling indicating a capability of the UE to adjust the first antenna configuration, the first set of resources, or both, for channel reliability management. The communications manager 1220 may be configured as or otherwise support a means for transmitting, to the UE based on the capability signaling, control signaling indicating one or more parameters for channel unreliability event detection associated with a downlink channel between the base station and the UE. The communications manager 1220 may be configured as or otherwise support a means for communicating one or more additional messages with the UE in accordance with a second antenna configuration at the UE, a second set of resources, or both, based on a channel unreliability event detected in accordance with the one or more parameters.

By including or configuring the communications manager 1220 in accordance with examples as described herein, the device 1205 may support techniques which may improve a reliability of wireless communications within the wireless communications system 100 while simultaneously reducing power consumption at the UE 115. In particular, techniques described herein may enable UEs 115 to communicate with the network using less power-intensive antenna configurations and/or resources, and may enable the UEs 115 to switch to more reliable (and more power-intensive) antenna configurations and/or resources upon identification of a channel reliability event. Accordingly, techniques descried herein may reduce an overall power consumption at the UE 115, and may enable for more reliable wireless communications with the network upon identification of a channel unreliability event.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for adapting communications upon channel unreliability event as described herein, or the processor 1240 and the memory 1230 may be otherwise configured to perform or support such operations.

Figure 13:
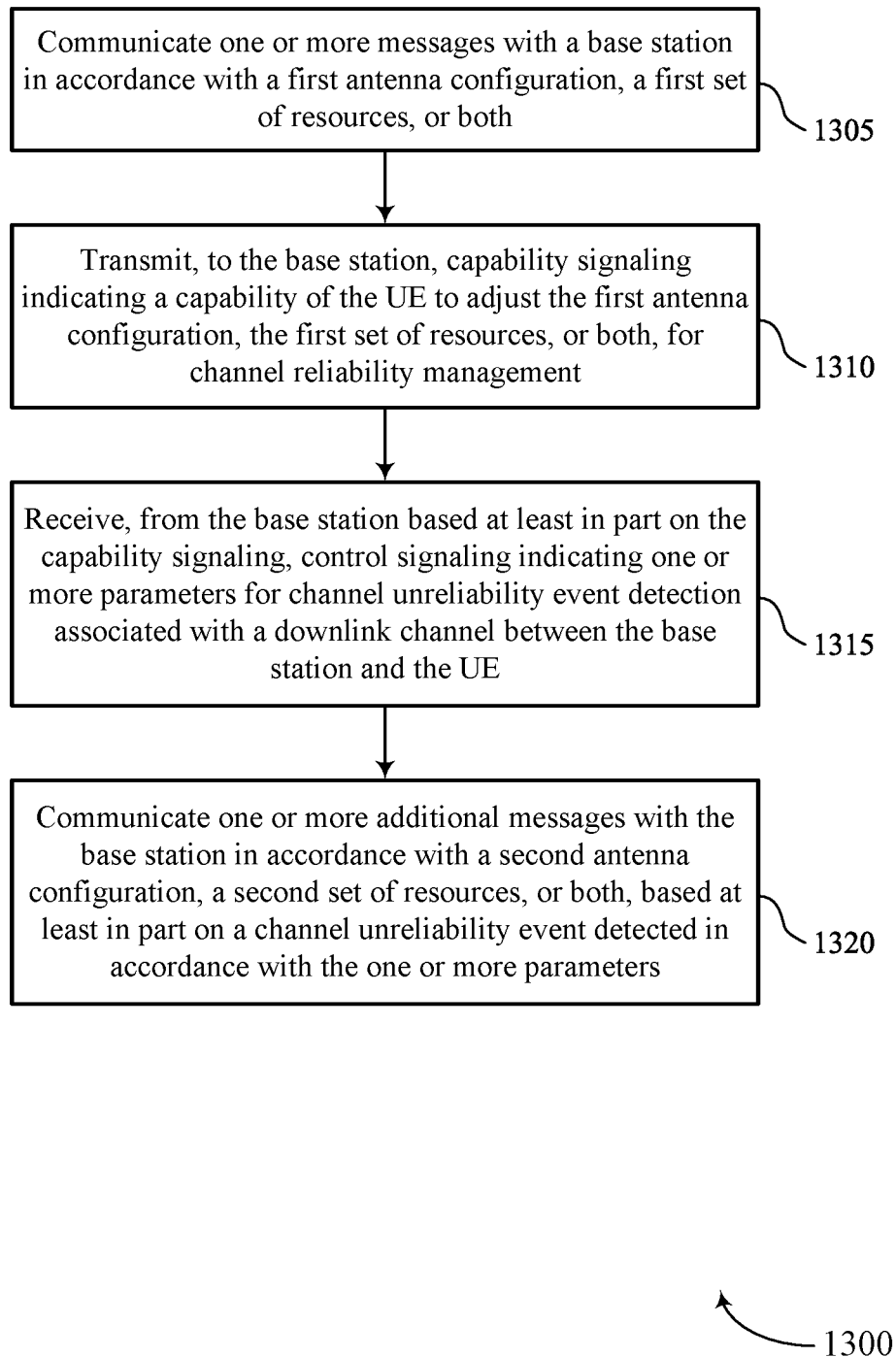
FIGS. 13 through 16 show flowcharts illustrating methods that support techniques for adapting communications upon channel unreliability event in accordance with aspects of the present disclosure.

FIG. 13 shows a flowchart illustrating a method 1300 that supports techniques for adapting communications upon channel unreliability event in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include communicating one or more messages with a base station in accordance with a first antenna configuration, a first set of resources, or both. The operations of 1305 may be performed in accordance with examples as disclosed herein. In some examples, aspects of the operations of 1305 may be performed by a base station communicating manager 725 as described with reference to FIG. 7.

At 1310, the method may include transmitting, to the base station, capability signaling indicating a capability of the UE to adjust the first antenna configuration, the first set of resources, or both, for channel reliability management. The operations of 1310 may be performed in accordance with examples as disclosed herein. In some examples, aspects of the operations of 1310 may be performed by a capability signaling transmitting manager 730 as described with reference to FIG. 7.

At 1315, the method may include receiving, from the base station based on the capability signaling, control signaling indicating one or more parameters for channel unreliability event detection associated with a downlink channel between the base station and the UE. The operations of 1315 may be performed in accordance with examples as disclosed herein. In some examples, aspects of the operations of 1315 may be performed by a control signaling receiving manager 735 as described with reference to FIG. 7.

At 1320, the method may include communicating one or more additional messages with the base station in accordance with a second antenna configuration, a second set of resources, or both, based on a channel unreliability event detected in accordance with the one or more parameters. The operations of 1320 may be performed in accordance with examples as disclosed herein. In some examples, aspects of the operations of 1320 may be performed by a base station communicating manager 725 as described with reference to FIG. 7.

Figure 14:
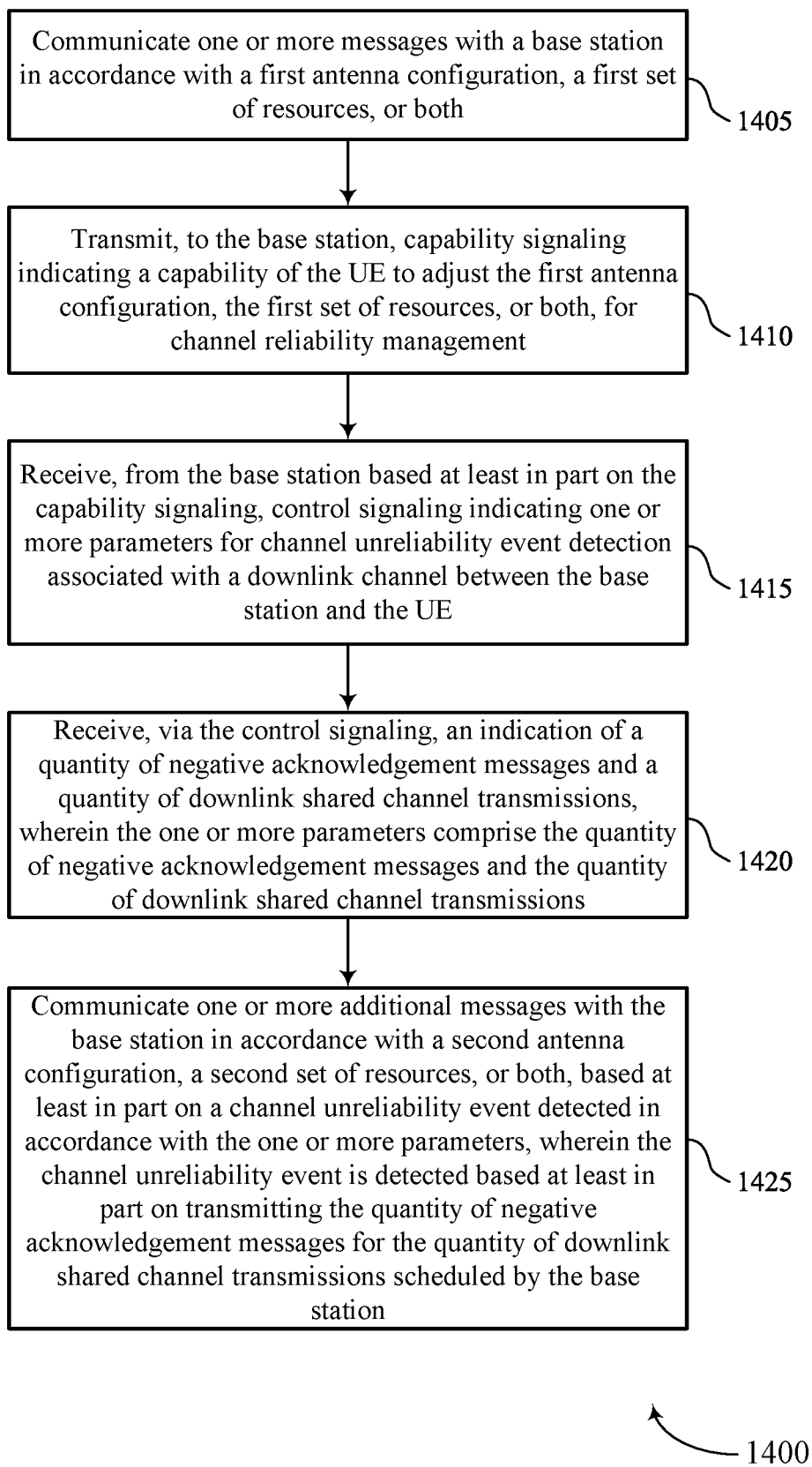

FIG. 14 shows a flowchart illustrating a method 1400 that supports techniques for adapting communications upon channel unreliability event in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include communicating one or more messages with a base station in accordance with a first antenna configuration, a first set of resources, or both. The operations of 1405 may be performed in accordance with examples as disclosed herein. In some examples, aspects of the operations of 1405 may be performed by a base station communicating manager 725 as described with reference to FIG. 7.

At 1410, the method may include transmitting, to the base station, capability signaling indicating a capability of the UE to adjust the first antenna configuration, the first set of resources, or both, for channel reliability management. The operations of 1410 may be performed in accordance with examples as disclosed herein. In some examples, aspects of the operations of 1410 may be performed by a capability signaling transmitting manager 730 as described with reference to FIG. 7.

At 1415, the method may include receiving, from the base station based on the capability signaling, control signaling indicating one or more parameters for channel unreliability event detection associated with a downlink channel between the base station and the UE. The operations of 1415 may be performed in accordance with examples as disclosed herein. In some examples, aspects of the operations of 1415 may be performed by a control signaling receiving manager 735 as described with reference to FIG. 7.

At 1420, the method may include receiving, via the control signaling, an indication of a quantity of NACK messages and a quantity of downlink shared channel transmissions, where the one or more parameters include the quantity of NACK messages and the quantity of downlink shared channel transmissions. The operations of 1420 may be performed in accordance with examples as disclosed herein. In some examples, aspects of the operations of 1420 may be performed by a control signaling receiving manager 735 as described with reference to FIG. 7.

At 1425, the method may include communicating one or more additional messages with the base station in accordance with a second antenna configuration, a second set of resources, or both, based on a channel unreliability event detected in accordance with the one or more parameters, where the channel unreliability event is detected based on transmitting the quantity of NACK messages for the quantity of downlink shared channel transmissions scheduled by the base station. The operations of 1425 may be performed in accordance with examples as disclosed herein. In some examples, aspects of the operations of 1425 may be performed by a base station communicating manager 725 as described with reference to FIG. 7.

Figure 15:
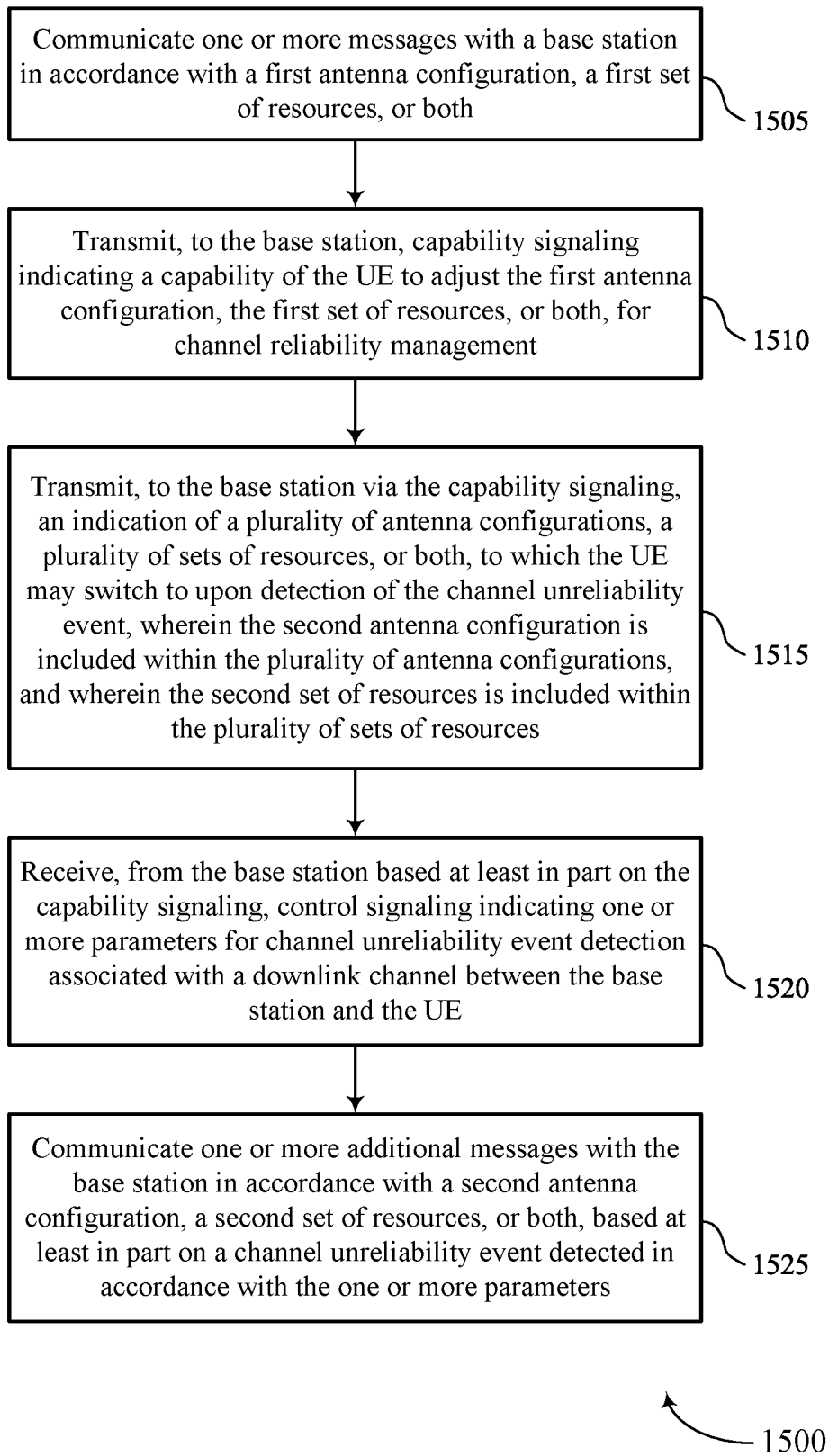

FIG. 15 shows a flowchart illustrating a method 1500 that supports techniques for adapting communications upon channel unreliability event in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include communicating one or more messages with a base station in accordance with a first antenna configuration, a first set of resources, or both. The operations of 1505 may be performed in accordance with examples as disclosed herein. In some examples, aspects of the operations of 1505 may be performed by a base station communicating manager 725 as described with reference to FIG. 7.

At 1510, the method may include transmitting, to the base station, capability signaling indicating a capability of the UE to adjust the first antenna configuration, the first set of resources, or both, for channel reliability management. The operations of 1510 may be performed in accordance with examples as disclosed herein. In some examples, aspects of the operations of 1510 may be performed by a capability signaling transmitting manager 730 as described with reference to FIG. 7.

At 1515, the method may include transmitting, to the base station via the capability signaling, an indication of a set of multiple antenna configurations, a set of multiple sets of resources, or both, to which the UE may switch to upon detection of the channel unreliability event, where the second antenna configuration is included within the set of multiple antenna configurations, and where the second set of resources is included within the set of multiple sets of resources. The operations of 1515 may be performed in accordance with examples as disclosed herein. In some examples, aspects of the operations of 1515 may be performed by a capability signaling transmitting manager 730 as described with reference to FIG. 7.

At 1520, the method may include receiving, from the base station based on the capability signaling, control signaling indicating one or more parameters for channel unreliability event detection associated with a downlink channel between the base station and the UE. The operations of 1520 may be performed in accordance with examples as disclosed herein. In some examples, aspects of the operations of 1520 may be performed by a control signaling receiving manager 735 as described with reference to FIG. 7.

At 1525, the method may include communicating one or more additional messages with the base station in accordance with a second antenna configuration, a second set of resources, or both, based on a channel unreliability event detected in accordance with the one or more parameters. The operations of 1525 may be performed in accordance with examples as disclosed herein. In some examples, aspects of the operations of 1525 may be performed by a base station communicating manager 725 as described with reference to FIG. 7.

Figure 16:
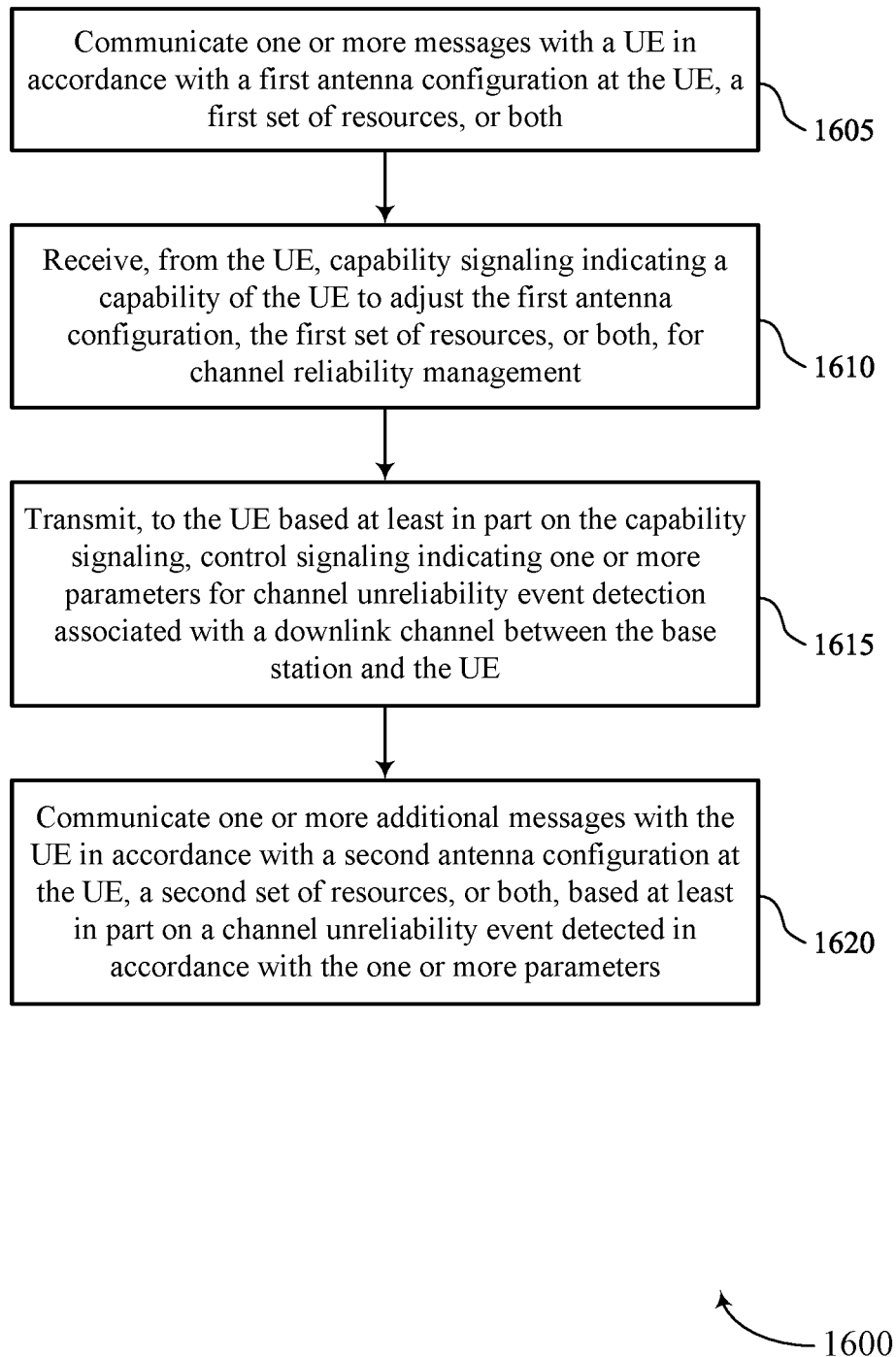

FIG. 16 shows a flowchart illustrating a method 1600 that supports techniques for adapting communications upon channel unreliability event in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include communicating one or more messages with a UE in accordance with a first antenna configuration at the UE, a first set of resources, or both. The operations of 1605 may be performed in accordance with examples as disclosed herein. In some examples, aspects of the operations of 1605 may be performed by a UE communicating manager 1125 as described with reference to FIG. 11.

At 1610, the method may include receiving, from the UE, capability signaling indicating a capability of the UE to adjust the first antenna configuration, the first set of resources, or both, for channel reliability management. The operations of 1610 may be performed in accordance with examples as disclosed herein. In some examples, aspects of the operations of 1610 may be performed by a capability signaling receiving manager 1130 as described with reference to FIG. 11.

At 1615, the method may include transmitting, to the UE based on the capability signaling, control signaling indicating one or more parameters for channel unreliability event detection associated with a downlink channel between the base station and the UE. The operations of 1615 may be performed in accordance with examples as disclosed herein. In some examples, aspects of the operations of 1615 may be performed by a control signaling transmitting manager 1135 as described with reference to FIG. 11.

At 1620, the method may include communicating one or more additional messages with the UE in accordance with a second antenna configuration at the UE, a second set of resources, or both, based on a channel unreliability event detected in accordance with the one or more parameters. The operations of 1620 may be performed in accordance with examples as disclosed herein. In some examples, aspects of the operations of 1620 may be performed by a UE communicating manager 1125 as described with reference to FIG. 11.

The following provides an overview of aspects of the present disclosure:

Aspect 1: A method for wireless communication at a UE, comprising: communicating one or more messages with a base station in accordance with a first antenna configuration, a first set of resources, or both; transmitting, to the base station, capability signaling indicating a capability of the UE to adjust the first antenna configuration, the first set of resources, or both, for channel reliability management; receiving, from the base station based at least in part on the capability signaling, control signaling indicating one or more parameters for channel unreliability event detection associated with a downlink channel between the base station and the UE; and communicating one or more additional messages with the base station in accordance with a second antenna configuration, a second set of resources, or both, based at least in part on a channel unreliability event detected in accordance with the one or more parameters.

Aspect 2: The method of aspect 1, further comprising: receiving, via the control signaling, an indication of a quantity of NACK messages and a quantity of downlink shared channel transmissions, wherein the one or more parameters comprise the quantity of NACK messages and the quantity of downlink shared channel transmissions, wherein the channel unreliability event is detected based at least in part on transmitting the quantity of NACK messages for the quantity of downlink shared channel transmissions scheduled by the base station.

Aspect 3: The method of any of aspects 1 through 2, further comprising: transmitting, to the base station via the capability signaling, an indication of a plurality of antenna configurations, a plurality of sets of resources, or both, to which the UE may switch to upon detection of the channel unreliability event, wherein the second antenna configuration is included within the plurality of antenna configurations, and wherein the second set of resources is included within the plurality of sets of resources.

Aspect 4: The method of any of aspects 1 through 3, further comprising: receiving, from the base station based at least in part on the capability signaling, additional control signaling indicating the second antenna configuration, an indication of the second set of resources, or both, wherein communicating the one or more additional messages in accordance with the second antenna configuration, the second set of resources, or both, is based at least in part on the additional control signaling.

Aspect 5: The method of any of aspects 1 through 4, wherein the first antenna configuration is associated with a first set of transmit antennas and a first set of receive antennas at the UE, the second antenna configuration is associated with a second set of transmit antennas and a second set of receive antennas at the UE, and at least one of the second set of transmit antennas and the second set of receive antennas is different from the first set of transmit antennas and the first set of receive antennas, respectively.

Aspect 6: The method of aspect 5, wherein the second set of receive antennas comprises more receive antennas relative to the first set of receive antennas, the second set of transmit antennas comprises more transmit antennas relative to the first set of transmit antennas, or both.

Aspect 7: The method of any of aspects 5 through 6, wherein the second set of receive antennas comprises each receive antenna at the UE, and the second set of transmit antennas comprises each transmit antenna at the UE, or both.

Aspect 8: The method of any of aspects 1 through 7, wherein the second antenna configuration is associated with full antenna sounding at the UE.

Aspect 9: The method of any of aspects 1 through 8, wherein the first set of resources comprises a first BWP and wherein the second set of resources comprises a second BWP which is larger than the first BWP, the method further comprising: performing a BWP switching procedure from the first BWP to the second BWP based on the identification of the channel unreliability event, wherein communicating the one or more messages with the base station in accordance with the second antenna configuration, the second set of resources, or both, is based at least in part on performing the BWP switching procedure.

Aspect 10: The method of aspect 9, further comprising: receiving, via the control signaling, an indication of a time interval for performing BWP switching procedures, the one or more parameters indicating the time interval, wherein the BWP switching procedure is performed during a time period that occurs subsequent to the identification of the channel unreliability event which is greater than or equal to the time interval.

Aspect 11: The method of aspect 10, further comprising: transmitting, via the capability signaling, an indication of one or more time intervals supported by the UE, the one or more time intervals comprising the time interval.

Aspect 12: The method of any of aspects 1 through 11, wherein the first set of resources comprises a first resource block pattern, a first sounding pattern, or both, and the second set of resources comprises a second resource block pattern, a second sounding pattern, or both.

Aspect 13: The method of any of aspects 1 through 12, wherein the first antenna configuration comprises a first combination density, and the second antenna configuration comprises a second combination density which is greater than the first combination density.

Aspect 14: The method of any of aspects 1 through 13, wherein the first antenna configuration comprises a first SRS repetition density, and the second antenna configuration comprises a second SRS repetition density which is greater than the first SRS repetition density.

Aspect 15: The method of any of aspects 1 through 14, further comprising: receiving, via the control signaling, an indication of an antenna grouping configuration which allocates a plurality of antennas of the UE into one or more sounding groups, wherein communicating the one or more additional messages with the base station in accordance with the second antenna configuration, the second set of resources, or both, comprises communicating in accordance with the antenna grouping configuration.

Aspect 16: The method of aspect 15, further comprising: transmitting, via the capability signaling, an indication of a plurality of antenna grouping configurations supported by the UE, wherein the antenna grouping configuration is included within the plurality of antenna grouping configurations.

Aspect 17: The method of any of aspects 1 through 16, further comprising: receiving, via the control signaling, an indication of the second set of resources, wherein communicating the one or more additional messages with the base station in accordance with the second set of resources is based at least in part on receiving the indication of the second set of resources.

Aspect 18: The method of any of aspects 1 through 17, further comprising: receiving additional control signaling from the base station; and communicating with the base station in accordance with the first antenna configuration, the first set of resources, or both, based at least in part on receiving the additional control signaling.

Aspect 19: The method of any of aspects 1 through 18, further comprising: communicating with the base station in accordance with the first antenna configuration, the first set of resources, or both, based at least in part on an identification of a channel reliability event associated with the downlink channel between the base station and the UE.

Aspect 20: The method of aspect 19, further comprising: receiving, via the control signaling, an indication of one or more additional parameters for channel reliability event detection, wherein the channel reliability event is detected in accordance with the one or more additional parameters.

Aspect 21: The method of aspect 20, further comprising: receiving, via the control signaling, an indication of a quantity of positive acknowledgement messages and a quantity of downlink shared channel transmissions, wherein the one or more parameters comprise the quantity of positive acknowledgement messages and the quantity of downlink shared channel transmissions, wherein the channel reliability event is identified based at least in part on transmitting the quantity of positive acknowledgement messages for the quantity of downlink shared channel transmissions scheduled by the base station.

Aspect 22: The method of any of aspects 1 through 21, wherein the control signaling comprises a radio resource control message, a medium access control-control element message, or both.

Aspect 23: A method for wireless communication at a base station, comprising: communicating one or more messages with a UE in accordance with a first antenna configuration at the UE, a first set of resources, or both; receiving, from the UE, capability signaling indicating a capability of the UE to adjust the first antenna configuration, the first set of resources, or both, for channel reliability management; transmitting, to the UE based at least in part on the capability signaling, control signaling indicating one or more parameters for channel unreliability event detection associated with a downlink channel between the base station and the UE; and communicating one or more additional messages with the UE in accordance with a second antenna configuration at the UE, a second set of resources, or both, based at least in part on a channel unreliability event detected in accordance with the one or more parameters.

Aspect 24: The method of aspect 23, further comprising: transmitting, via the control signaling, an indication of a quantity of NACK messages and a quantity of downlink shared channel transmissions, wherein the one or more parameters comprise the quantity of NACK messages and the quantity of downlink shared channel transmissions, wherein the channel unreliability event is detected based at least in part on receiving the quantity of NACK messages for the quantity of downlink shared channel transmissions scheduled by the base station.

Aspect 25: The method of any of aspects 23 through 24, further comprising: receiving, from the UE via the capability signaling, an indication of a plurality of antenna configurations, a plurality of sets of resources, or both, to which the UE may switch to upon detection of the channel unreliability event, wherein the second antenna configuration is included within the plurality of antenna configurations, and wherein the second set of resources is included within the plurality of sets of resources.

Aspect 26: The method of any of aspects 23 through 25, further comprising: transmitting, to the UE based at least in part on the capability signaling, additional control signaling indicating the second antenna configuration, an indication of the second set of resources, or both, wherein communicating the one or more additional messages in accordance with the second antenna configuration, the second set of resources, or both, is based at least in part on the additional control signaling.

Aspect 27: The method of any of aspects 23 through 26, wherein the first antenna configuration is associated with a first set of transmit antennas and a first set of receive antennas at the UE, the second antenna configuration is associated with a second set of transmit antennas and a second set of receive antennas at the UE, and at least one of the second set of transmit antennas and the second set of receive antennas is different from the first set of transmit antennas and the first set of receive antennas, respectively.

Aspect 28: The method of aspect 27, wherein the second set of receive antennas comprises more receive antennas relative to the first set of receive antennas, the second set of transmit antennas comprises more transmit antennas relative to the first set of transmit antennas, or both.

Aspect 29: The method of any of aspects 27 through 28, wherein the second set of receive antennas comprises each receive antenna at the UE, and the second set of transmit antennas comprises each transmit antenna at the UE, or both.

Aspect 30: The method of any of aspects 23 through 29, wherein the second antenna configuration is associated with full antenna sounding at the UE.

Aspect 31: The method of any of aspects 23 through 30, further comprising: transmitting, via the control signaling, an indication of a time interval for performing BWP switching procedures at the UE, the one or more parameters indicating the time interval, wherein communicating the one or more additional messages in accordance with the second set of resources, or both, is based at least in part on the time interval.

Aspect 32: The method of aspect 31, further comprising: receiving, via the capability signaling, an indication of one or more time intervals supported by the UE, the one or more time intervals comprising the time interval.

Aspect 33: The method of any of aspects 23 through 32, wherein the first set of resources comprises a first resource block pattern, a first sounding pattern, or both, and the second set of resources comprises a second resource block pattern, a second sounding pattern, or both.

Aspect 34: The method of any of aspects 23 through 33, wherein the first antenna configuration comprises a first combination density, and the second antenna configuration comprises a second combination density which is greater than the first combination density.

Aspect 35: The method of any of aspects 23 through 34, wherein the first antenna configuration comprises a first SRS repetition density, and the second antenna configuration comprises a second SRS repetition density which is greater than the first SRS repetition density.

Aspect 36: The method of any of aspects 23 through 35, further comprising: transmitting, via the control signaling, an indication of an antenna grouping configuration which allocates a plurality of antennas of the UE into one or more sounding groups, wherein communicating the one or more additional messages with the UE in accordance with the second antenna configuration, the second set of resources, or both, comprises communicating in accordance with the antenna grouping configuration.

Aspect 37: The method of aspect 36, further comprising: receiving, via the capability signaling, an indication of a plurality of antenna grouping configurations supported by the UE, wherein the antenna grouping configuration is included within the plurality of antenna grouping configurations.

Aspect 38: The method of any of aspects 23 through 37, further comprising: transmitting, via the control signaling, an indication of the second set of resources, wherein communicating the one or more additional messages with the UE in accordance with the second set of resources is based at least in part on transmitting the indication of the second set of resources.

Aspect 39: The method of any of aspects 23 through 38, further comprising: transmitting additional control signaling to the UE; and communicating with the UE in accordance with the first antenna configuration, the first set of resources, or both, based at least in part on transmitting the additional control signaling.

Aspect 40: The method of any of aspects 23 through 39, further comprising: communicating with the UE in accordance with the first antenna configuration, the first set of resources, or both, based at least in part on an identification of a channel reliability event associated with the downlink channel between the base station and the UE.

Aspect 41: The method of aspect 40, further comprising: transmitting, via the control signaling, an indication of one or more additional parameters for channel reliability event detection, wherein the channel reliability event is detected in accordance with the one or more additional parameters.

Aspect 42: The method of aspect 41, further comprising: transmitting, via the control signaling, an indication of a quantity of positive acknowledgement messages and a quantity of downlink shared channel transmissions, wherein the one or more parameters comprise the quantity of positive acknowledgement messages and the quantity of downlink shared channel transmissions, wherein the channel reliability event is identified based at least in part on receiving the quantity of positive acknowledgement messages for the quantity of downlink shared channel transmissions scheduled by the base station.

Aspect 43: The method of any of aspects 23 through 42, wherein the control signaling comprises a radio resource control message, a medium access control-control element message, or both.

Aspect 44: An apparatus for wireless communication at a UE, comprising a processor; memory coupled with the processor; and instructions stored in the memory and executable by the processor to cause the apparatus to perform a method of any of aspects 1 through 22.

Aspect 45: An apparatus for wireless communication at a UE, comprising at least one means for performing a method of any of aspects 1 through 22.

Aspect 46: A non-transitory computer-readable medium storing code for wireless communication at a UE, the code comprising instructions executable by a processor to perform a method of any of aspects 1 through 22.

Aspect 47: An apparatus for wireless communication at a base station, comprising a processor; memory coupled with the processor; and instructions stored in the memory and executable by the processor to cause the apparatus to perform a method of any of aspects 23 through 43.

Aspect 48: An apparatus for wireless communication at a base station, comprising at least one means for performing a method of any of aspects 23 through 43.

Aspect 49: A non-transitory computer-readable medium storing code for wireless communication at a base station, the code comprising instructions executable by a processor to perform a method of any of aspects 23 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more memories; and
one or more processors coupled to the one or more memories and configured to:
communicate one or more messages with a network entity in accordance with a first antenna configuration, a first set of resources, or both;
transmit, to the network entity, capability signaling indicating a capability of the UE to adjust the first antenna configuration, the first set of resources, or both, for channel reliability management;
receive, from the network entity based at least in part on the capability signaling, control signaling indicating one or more parameters for channel unreliability event detection associated with a downlink channel between the network entity and the UE;
communicate one or more additional messages with the network entity in accordance with a second antenna configuration, a second set of resources, or both, based at least in part on a channel unreliability event detected in accordance with the one or more parameters; and
communicate with the network entity in accordance with the first antenna configuration, the first set of resources, or both, based at least in part on an identification of a channel reliability event associated with the downlink channel between the network entity and the UE.

2. The apparatus of claim 1, wherein the one or more processors are further configured to:
receive, via the control signaling, an indication of a quantity of negative acknowledgement messages and a quantity of downlink shared channel transmissions, wherein the one or more parameters comprise the quantity of negative acknowledgement messages and the quantity of downlink shared channel transmissions, wherein the channel unreliability event is detected based at least in part on transmitting the quantity of negative acknowledgement messages for the quantity of downlink shared channel transmissions scheduled by the network entity.

3. The apparatus of claim 1, wherein the one or more processors are further configured to:
transmit, to the network entity via the capability signaling, an indication of a plurality of antenna configurations, a plurality of sets of resources, or both, to which the UE may switch to upon detection of the channel unreliability event, wherein the second antenna configuration is included within the plurality of antenna configurations, and wherein the second set of resources is included within the plurality of sets of resources.

4. The apparatus of claim 1, wherein the one or more processors are further configured to:
receive, from the network entity based at least in part on the capability signaling, additional control signaling indicating the second antenna configuration, an indication of the second set of resources, or both, wherein communicating the one or more additional messages in accordance with the second antenna configuration, the second set of resources, or both, is based at least in part on the additional control signaling.

5. The apparatus of claim 1, wherein the first antenna configuration is associated with a first set of transmit antennas and a first set of receive antennas at the UE, wherein the second antenna configuration is associated with a second set of transmit antennas and a second set of receive antennas at the UE, and wherein at least one of the second set of transmit antennas and the second set of receive antennas is different from the first set of transmit antennas and the first set of receive antennas, respectively.

6. The apparatus of claim 5, wherein the second set of receive antennas comprises more receive antennas relative to the first set of receive antennas, the second set of transmit antennas comprises more transmit antennas relative to the first set of transmit antennas, or both.

7. The apparatus of claim 5, wherein the second set of receive antennas comprises each receive antenna at the UE, and wherein the second set of transmit antennas comprises each transmit antenna at the UE, or both.

8. The apparatus of claim 1, wherein the second antenna configuration is associated with full antenna sounding at the UE.

9. The apparatus of claim 1, wherein the first set of resources comprises a first bandwidth part and the second set of resources comprises a second bandwidth part which is larger than the first bandwidth part, and the one or more processors are further configured to:
perform a bandwidth part switching procedure from the first bandwidth part to the second bandwidth part based at least in part on identification of the channel unreliability event, wherein communicating the one or more messages with the network entity in accordance with the second antenna configuration, the second set of resources, or both, is based at least in part on performing the bandwidth part switching procedure.

10. The apparatus of claim 9, wherein the one or more processors are further configured to:
receive, via the control signaling, an indication of a time interval for performing bandwidth part switching procedures, the one or more parameters indicating the time interval, wherein the bandwidth part switching procedure is performed during a time period that occurs subsequent to identification of the channel unreliability event which is greater than or equal to the time interval.

11. The apparatus of claim 10, wherein the one or more processors are further configured to:
transmit, via the capability signaling, an indication of one or more time intervals supported by the UE, the one or more time intervals comprising the time interval.

12. The apparatus of claim 1, wherein the first set of resources comprises a first resource block pattern, a first sounding pattern, or both, and wherein the second set of resources comprises a second resource block pattern, a second sounding pattern, or both.

13. The apparatus of claim 1, wherein the first antenna configuration comprises a first combination density, and the second antenna configuration comprises a second combination density which is greater than the first combination density.

14. The apparatus of claim 1, wherein the first antenna configuration comprises a first sounding reference signal repetition density, and the second antenna configuration comprises a second sounding reference signal repetition density which is greater than the first sounding reference signal repetition density.

15. The apparatus of claim 1, wherein the one or more processors are further configured to:

receive, via the control signaling, an indication of an antenna grouping configuration which allocates a plurality of antennas of the UE into one or more sounding groups, wherein communicating the one or more additional messages with the network entity in accordance with the second antenna configuration, the second set of resources, or both, comprises communicating in accordance with the antenna grouping configuration.

16. The apparatus of claim 15, wherein the one or more processors are further configured to:
transmit, via the capability signaling, an indication of a plurality of antenna grouping configurations supported by the UE, wherein the antenna grouping configuration is included within the plurality of antenna grouping configurations.

17. The apparatus of claim 1, wherein the one or more processors are further configured to:
receive, via the control signaling, an indication of the second set of resources, wherein communicating the one or more additional messages with the network entity in accordance with the second set of resources is based at least in part on receiving the indication of the second set of resources.

18. The apparatus of claim 1, wherein the one or more processors are further configured to:
receive additional control signaling from the network entity; and
communicate with the network entity in accordance with the first antenna configuration, the first set of resources, or both, based at least in part on receiving the additional control signaling.

19. The apparatus of claim 1, wherein the one or more processors are further configured to:
receive, via the control signaling, an indication of one or more additional parameters for channel reliability event detection, wherein the channel reliability event is detected in accordance with the one or more additional parameters.

20. The apparatus of claim 19, wherein the one or more processors are further configured to:
receive, via the control signaling, an indication of a quantity of positive acknowledgement messages and a quantity of downlink shared channel transmissions, wherein the one or more parameters comprise the quantity of positive acknowledgement messages and the quantity of downlink shared channel transmissions, wherein the channel reliability event is identified based at least in part on transmitting the quantity of positive acknowledgement messages for the quantity of downlink shared channel transmissions scheduled by the network entity.

21. The apparatus of claim 1, wherein the control signaling comprises a radio resource control message, a medium access control-control element message, or both.

22. An apparatus for wireless communication at a network entity, comprising:
one or more memories; and
one or more processors coupled to the one or more memories and configured to:
communicate one or more messages with a user equipment (UE) in accordance with a first antenna configuration at the UE, a first set of resources, or both;
receive, from the UE, capability signaling indicating a capability of the UE to adjust the first antenna configuration, the first set of resources, or both, for channel reliability management;
transmit, to the UE based at least in part on the capability signaling, control signaling indicating one or more parameters for channel unreliability event detection associated with a downlink channel between the network entity and the UE;
communicate one or more additional messages with the UE in accordance with a second antenna configuration at the UE, a second set of resources, or both, based at least in part on a channel unreliability event detected in accordance with the one or more parameters; and
communicate with the UE in accordance with the first antenna configuration, the first set of resources, or both, based at least in part on an identification of a channel reliability event associated with the downlink channel between the network entity and the UE.

23. The apparatus of claim 22, wherein the one or more processors are further configured to:
transmit, via the control signaling, an indication of a quantity of negative acknowledgement messages and a quantity of downlink shared channel transmissions, wherein the one or more parameters comprise the quantity of negative acknowledgement messages and the quantity of downlink shared channel transmissions, wherein the channel unreliability event is detected based at least in part on receiving the quantity of negative acknowledgement messages for the quantity of downlink shared channel transmissions scheduled by the network entity.

24. The apparatus of claim 22, wherein the one or more processors are further configured to:
receive, from the UE via the capability signaling, an indication of a plurality of antenna configurations, a plurality of sets of resources, or both, to which the UE may switch to upon detection of the channel unreliability event, wherein the second antenna configuration is included within the plurality of antenna configurations, and wherein the second set of resources is included within the plurality of sets of resources.

25. The apparatus of claim 22, wherein the one or more processors are further configured to:
transmit, to the UE based at least in part on the capability signaling, additional control signaling indicating the second antenna configuration, an indication of the second set of resources, or both, wherein communicating the one or more additional messages in accordance with the second antenna configuration, the second set of resources, or both, is based at least in part on the additional control signaling.

26. The apparatus of claim 22, wherein the first antenna configuration is associated with a first set of transmit antennas and a first set of receive antennas at the UE, wherein the second antenna configuration is associated with a second set of transmit antennas and a second set of receive antennas at the UE, and wherein at least one of the second set of transmit antennas and the second set of receive antennas is different from the first set of transmit antennas and the first set of receive antennas, respectively.

27. The apparatus of claim 26, wherein the second set of receive antennas comprises more receive antennas relative to the first set of receive antennas, the second set of transmit antennas comprises more transmit antennas relative to the first set of transmit antennas, or both.

28. A method for wireless communication at a user equipment (UE), comprising:

communicating one or more messages with a network entity in accordance with a first antenna configuration, a first set of resources, or both;

transmitting, to the network entity, capability signaling indicating a capability of the UE to adjust the first antenna configuration, the first set of resources, or both, for channel reliability management;

receiving, from the network entity based at least in part on the capability signaling, control signaling indicating one or more parameters for channel unreliability event detection associated with a downlink channel between the network entity and the UE;

communicating one or more additional messages with the network entity in accordance with a second antenna configuration, a second set of resources, or both, based at least in part on a channel unreliability event detected in accordance with the one or more parameters; and communicating with the network entity in accordance with the first antenna configuration, the first set of resources, or both, based at least in part on an identification of a channel reliability event associated with the downlink channel between the network entity and the UE.

29. A method for wireless communication at a network entity, comprising:

communicating one or more messages with a user equipment (UE) in accordance with a first antenna configuration at the UE, a first set of resources, or both;

receiving, from the UE, capability signaling indicating a capability of the UE to adjust the first antenna configuration, the first set of resources, or both, for channel reliability management;

transmitting, to the UE based at least in part on the capability signaling, control signaling indicating one or more parameters for channel unreliability event detection associated with a downlink channel between the network entity and the UE;

communicating one or more additional messages with the UE in accordance with a second antenna configuration at the UE, a second set of resources, or both, based at least in part on a channel unreliability event detected in accordance with the one or more parameters; and communicating with the UE in accordance with the first antenna configuration, the first set of resources, or both, based at least in part on an identification of a channel reliability event associated with the downlink channel between the network entity and the UE.

* * * * *